Jan. 30, 1962 M. H. ESPERSETH ET AL 3,019,294

PAYSTATION CUSTOMER DIALLING IN A TOLL TICKETING TELEPHONE SYSTEM

Filed July 3, 1959 23 Sheets-Sheet 1

INVENTORS
MAURICE H. ESPERSETH
JOHN E. OSTLINE
BY
C. A. Gulbrandsen
ATTY.

Jan. 30, 1962 M. H. ESPERSETH ET AL 3,019,294

PAYSTATION CUSTOMER DIALLING IN A TOLL TICKETING TELEPHONE SYSTEM

Filed July 3, 1959 23 Sheets-Sheet 3

Jan. 30, 1962 M. H. ESPERSETH ET AL 3,019,294
PAYSTATION CUSTOMER DIALLING IN A TOLL TICKETING TELEPHONE SYSTEM
Filed July 3, 1959 23 Sheets-Sheet 10

Jan. 30, 1962

M. H. ESPERSETH ET AL 3,019,294

PAYSTATION CUSTOMER DIALLING IN A TOLL TICKETING TELEPHONE SYSTEM

Filed July 3, 1959

23 Sheets-Sheet 12

Jan. 30, 1962

M. H. ESPERSETH ET AL

PAYSTATION CUSTOMER DIALLING IN A TOLL TICKETING TELEPHONE SYSTEM 3,019,294

Filed July 3, 1959

23 Sheets-Sheet 15

Jan. 30, 1962

M. H. ESPERSETH ET AL 3,019,294

PAYSTATION CUSTOMER DIALLING IN A TOLL TICKETING TELEPHONE SYSTEM

Filed July 3, 1959

23 Sheets-Sheet 20

Jan. 30, 1962 M. H. ESPERSETH ET AL 3,019,294

PAYSTATION CUSTOMER DIALLING IN A TOLL TICKETING TELEPHONE SYSTEM

Filed July 3, 1959 23 Sheets-Sheet 21

3,019,294

PAYSTATION CUSTOMER DIALLING IN A TOLL TICKETING TELEPHONE SYSTEM

Maurice H. Esperseth, Mount Prospect, and John E. Ostline, Elmwood Park, Ill., assignors to Automatic Electric Laboratories, Inc., a corporation of Delaware Filed July 3, 1959, Ser. No. 824,805
16 Claims. (Cl. 179—6.3)

The present invention relates to automatic toll ticketing telephone systems in general and, in particular, to improvements in such telephone systems whereby paystation customers may utilize the automatic toll switching equipment to dial short haul toll calls. More particularly, the present invention relates to improvements in automatic toll ticketing telephone systems of the character disclosed in the John E. Ostline Patent No. 2,678,353, granted May 11, 1954.

An automatic toll ticketing telephone system of the type disclosed in the above-mentioned Ostline patent is divided into a plurality of zones and each zone includes one or more telephone exchanges. Telephone connections that are established between the subscribers of the different exchanges in the different zones and between subscribers in the different exchanges in the same zones are handled on a toll basis so that the charges for the connections may be assessed against the calling subscriber substation in accordance with the distance between the exchanges and the time duration of the connections. Each telephone connection is established automatically under control of a register sender and a record is produced containing the particulars concerning the connection including the office code digits identifying both the calling and the called exchange, the numerical digits identifying both the calling and the called subscriber lines, and other pertinent particulars including the duration of the connection, the date, and identity of certain of the apparatus that has been used in establishing the toll connection. The charge for the call can then be determined either by the toll ticketing equipment utilized in the connection or by means of the conventional business machines which are controlled in accordance with the recorded information.

The telephone connections in the above-identified Ostline patent, and also in the present system, are automatically completed from a calling subscriber station to a desired called subscriber station under control of a register-sender apparatus provided in the originating exchange. In extending a connection, the calling subscriber merely operates his calling device in accordance with the directory number of the desired called subscriber station including the office code portion of the number which comprises the first two letters of the called exchange name and a digit identifying the particular called exchange in the zone. The directory number dialled by the calling subscriber also includes a numerical portion comprising four digits designating the called subscriber substation in the particular called exchange. Consequently, each subscriber directry number normally constitutes a seven-digit number. The first three digits dialled by a calling subscriber are registered in the register-sender and are translated into one or more routing digits so that the call will be properly routed to the particular called exchange.

The first three digits of a seven digit called number always includes the first two letters of the called exchange name and the digit identifying the particular called exchange. In addition to determining the routing digits to be transmitted by the register-sender, the called office code will also control the sender to thereafter transmit certain of the first three digits identifying the called exchange and then all of the digits constituting the numerical portion of the called subscriber directory number. Thus, it will be understood that the register-sender will first transmit the routing digits, then the determined digits of the called exchange code, whether two or three digit, and finally the four digits constituting the numerical portion of the called subscriber directory number.

In the above-mentioned Ostline patent, as well as in the present system, an idle register-sender is automatically associated with the calling subscriber line and the digits of the called subscriber directory number, as dialled by the calling subscriber, are registered therein. In response to the registration of the first three digits, a common translator mechanism is automatically associated with the register-sender in order to perform the translation operations briefly noted above. The translator mechanism functions to translate the first three digits registered in the register-sender into one or more routing digits and it registers these routing digits in the register-sender. Thereafter, the translator mechanism is disconnected from the register-sender and is rendered available to other register-senders. Transmission of the routing digits is controlled by the register-sender and, depending upon the selective control to the translator, certain of the digits of the called exchange code, as registered in the register-sender, are then transmitted, and finally the four digits of the numerical portion of the called number are transmitted in order to control the switching apparatus to complete the telephone connection to the desired called subscriber. During the establishment of the above-mentioned connection, various items of record information pertaining thereto, such as the calling subscriber directory number, the called subscriber directory number, and other pertinent items of information are transmitted by the register-sender and temporarily registered in a toll ticket repeater that is included in the connection. These items of information are subsequently utilized, upon the release of the telephone connection, to produce a record including the elapsed time of the connection.

In response to the release of the toll ticket repeater an idle tabulator is associated therewith so that the items of record information may be transferred to the tabulator and temporarily stored therein until appropriate recording apparatus is associated with the tabulator to produce a record of the connection. The records produced by the recording apparatus may be utilized by the operating telephone company to control appropriate business machines to produce printed records of the various items of information pertaining to each toll call.

In such register-sender equipped exchanges facilities are not available to permit paystation customers to utilize this improved manner of completing toll calls. Because of this, such customers are obliged to rely upon the services of an operator to complete their toll calls and the operating company must retain a large number of operators to extend and supervise them.

Accordingly, it is a broad general object of this invention to make provisions for permitting paystation customers in automatic toll ticketing exchanges to dial their own toll calls.

It is still another object of the invention to provide circuits and apparatus for accessing an operator to monitor the deposit of coins at the paystation in the proper amount for the call placed.

Another object of this invention is to provide circuits and apparatus to automatically time the duration of the call and should the duration exceed the initial period to again call for the services of an operator to request and monitor additional charges.

It is a feature of the invention that the rate applicable to the call and the time duration of the call are displayed at the operator position.

Further objects and features of this invention, broadly stated, are to improve systems of the above-described general character by the provision of new and improved circuits and apparatus for performing the necessary operations conveniently and economically.

The invention, both as to its arrangement and its operation, together with the advantages thereof, will best be understood by reference to the following specification taken in connection with the accompanying drawings in which FIG. 24 illustrates the manner of combining FIGS. 1 to 23 inclusive of the drawings to form a unified system.

FIGURE 1 illustrates the details in schematic form of the collector-finder circuit. This circuit is designed to search for a collector circuit calling for an initial fee trunk circuit.

FIGS. 2 and 3 disclose in schematic form the details of the initial fee trunk circuit. This circuit is designed to extend coin control functions to an operator and to relay a rate index for the attempted call from the collector circuit. It is released under the control of an operator.

FIG. 4 discloses in schematic form the details of the operator's control circuit, whose main functions are to give the operator access to the initial fee trunks and to read off and translate the rate information from the collector circuit.

FIG. 5 illustrates the details of a collector finder circuit for connecting an overtime trunk to the collector circuit.

FIGS. 6 through 9 disclose in schematic form the details of the overtime trunk circuit. This circuit is called for by the collector circuit upon the lapse of the initial fee period. It serves to call for the services of an operator, extends to the operator position the rate and time information translated into digital form, and extends CLR holding of the switch train.

FIGS. 10 through 16 disclose in schematic form the details of the collector circuit. This is the basic control unit of the coin box customer dialling system. It is accessed from the bank contacts of the primary selector. The customer dials into the register-sender, which performs its regular functions of registering, translating, and sending, but the digits pulsed out from the register-sender are directed to the collector circuit. The first two digits are registered and stored in the collector circuit and provide a "rate index" and an indication whether the call is to a step-by-step or a crossbar office. The succeeding digits are repeated by this circuit to the sender circuit.

When the register-sender completes its functions and switches the line leads to the paystation loop, the collector circuit seizes an initial fee trunk circuit, the operator is signalled, and if the call is to a step-by-step office, a mark is sent to the sender to send all but the last two digits. The operator enters the connection, states the charges for the initial three minutes, and monitors while the calling party deposits coins. When the operator disconnects, a mark is sent to the sender to pulse out all of the digits to a crossbar office, or the two remaining digits to a step-by-step office.

All succeeding functions are performed automatically by the collector circuit and the operator's service is not required unless the end of the three minute initial period is reached. If a call is not completed, the coin refund voltage is provided by this circuit; if the call is completed, the coin collect voltage is provided by the paystation repeater. Thus, on calls which terminate within the three minute initial time period the single function of the operator is to monitor the initial toll charge coin deposit.

When answer supervision is received from the calling line, the collector circuit starts timing, and, at the end of three minutes, causes the seizure of the overtime trunk, and signals the operator. The operator enters the connection and states the overtime condition. Thereafter, CLR holding is placed on the switch train. Upon completion of each minute of overtime, the collector circuit transmits a mark to the overtime trunk circuit, which, at the completion of the call, will display the elapsed time at the operator's position.

FIGS. 17 through 21 disclose in schematic form the details of the sender circuit. This circuit is seized by the collector circuit upon the latter's seizure by a register-sender to store the directive outpulsed from the register-sender. The directive is stored as groups of operated relays. This directive is again outpulsed when the collector circuit forwards a "send" mark. It will send all but the last two digits on a call to a step-by-step office upon the register-sender release, and send the last two digits or all of the digits uninterrupted on calls to a crossbar office upon the operator's release from the initial fee trunk. It will recognize a stop-send or busy condition and will extend the interdigital period to distinguish between a flash busy and a stop-send condition. If the stop-send condition persists for more than five seconds or if a busy condition exists, the sender circuit will release.

Figure 1:
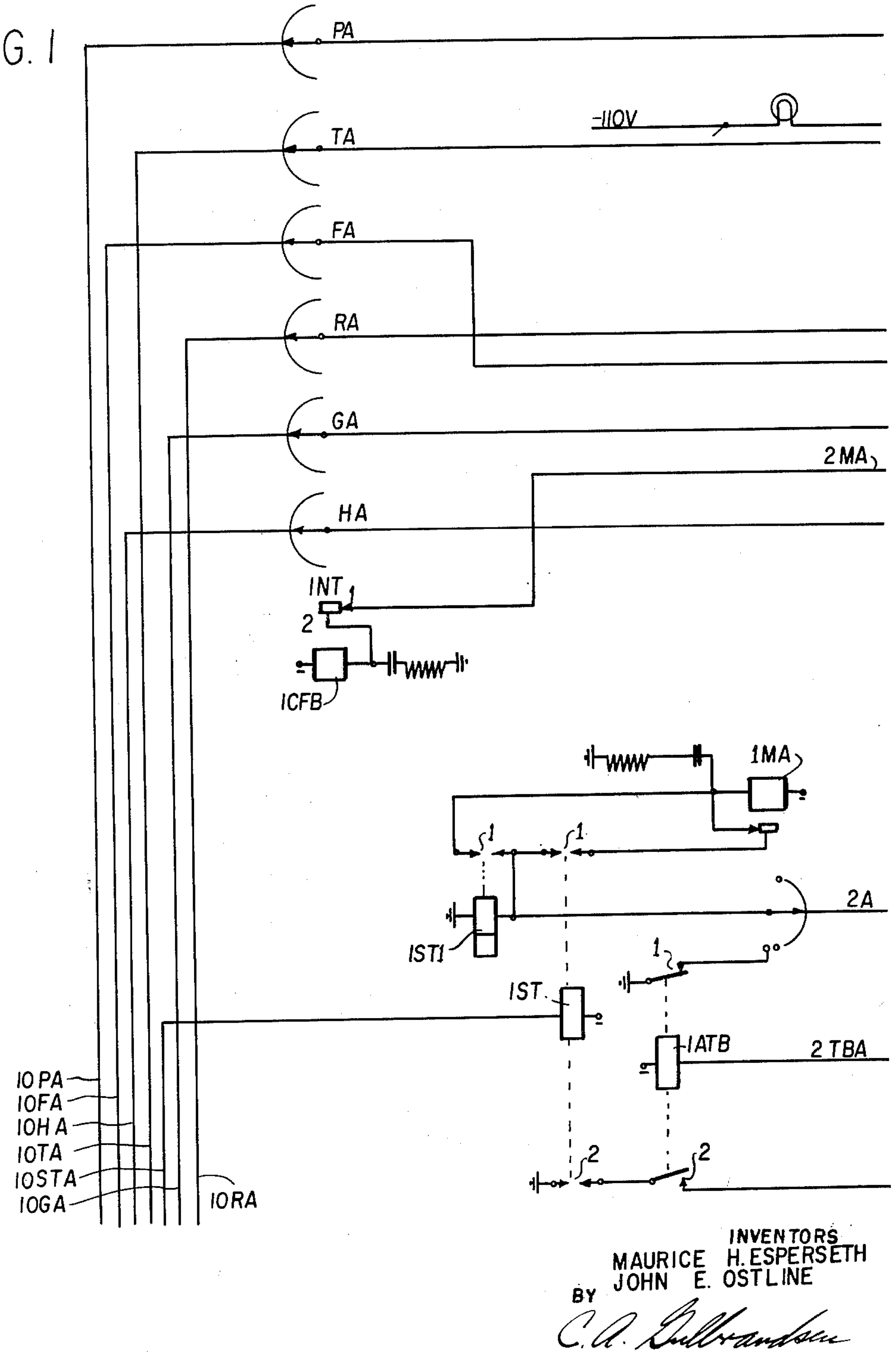
Figure 2:
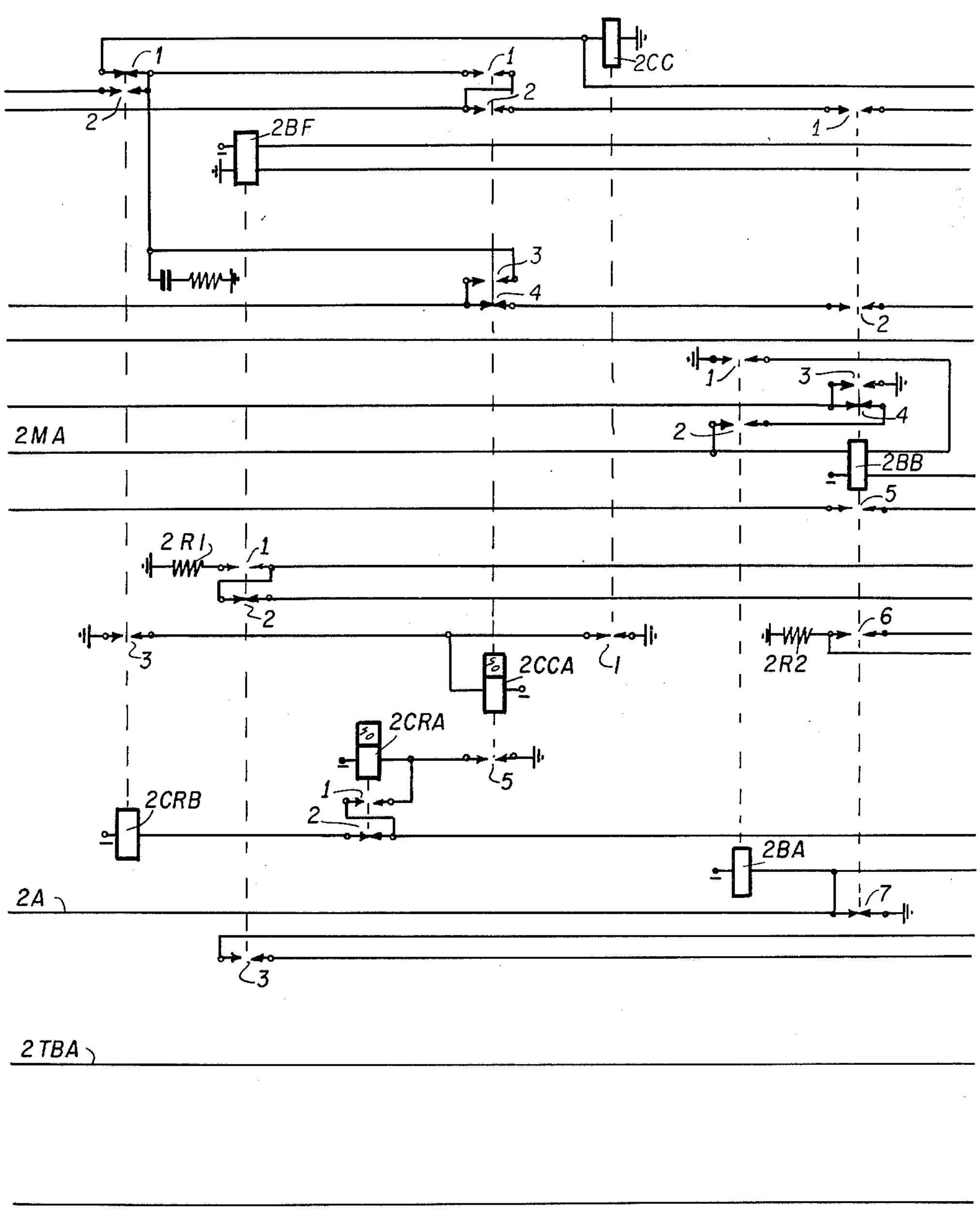
Figure 3:
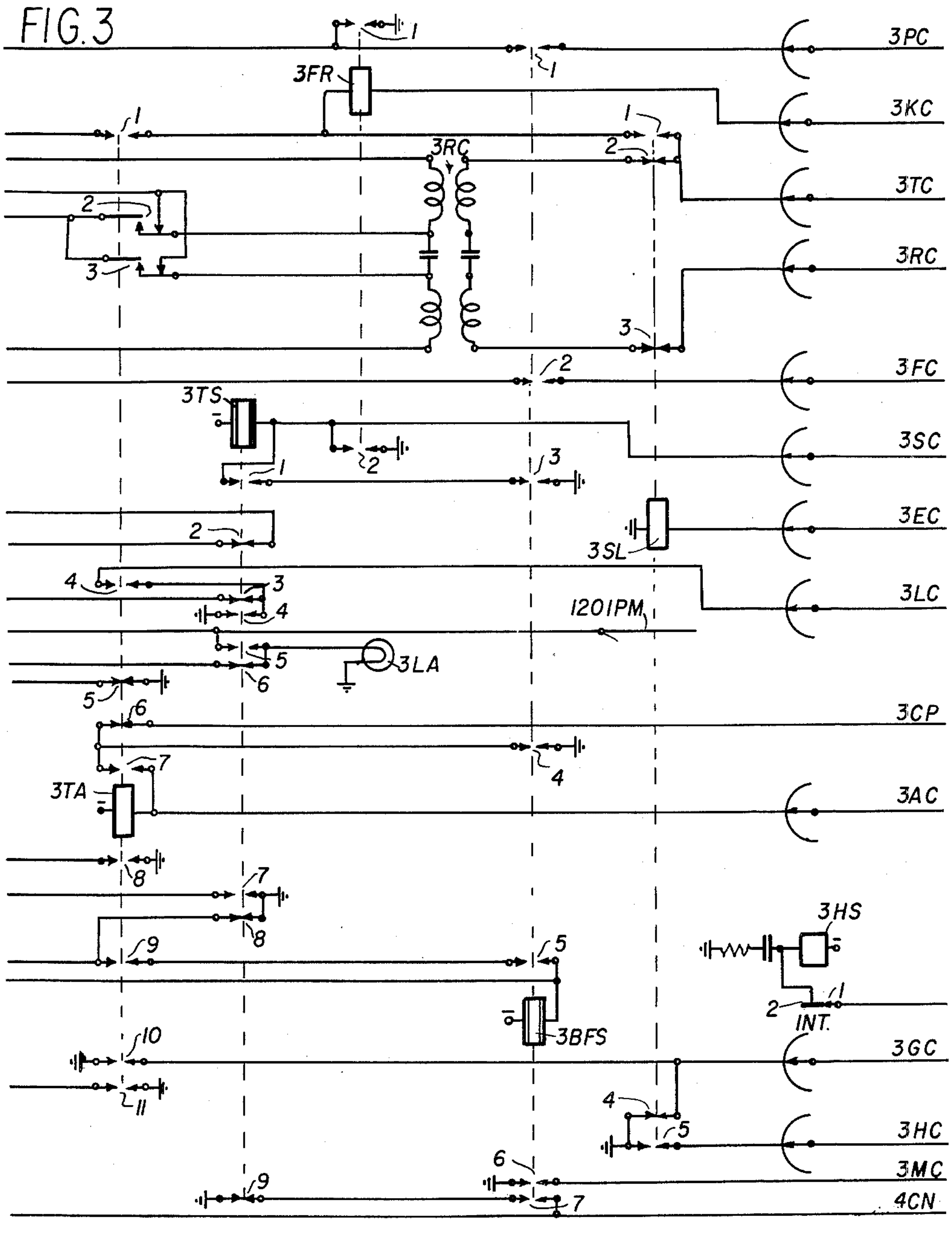
Figure 4:
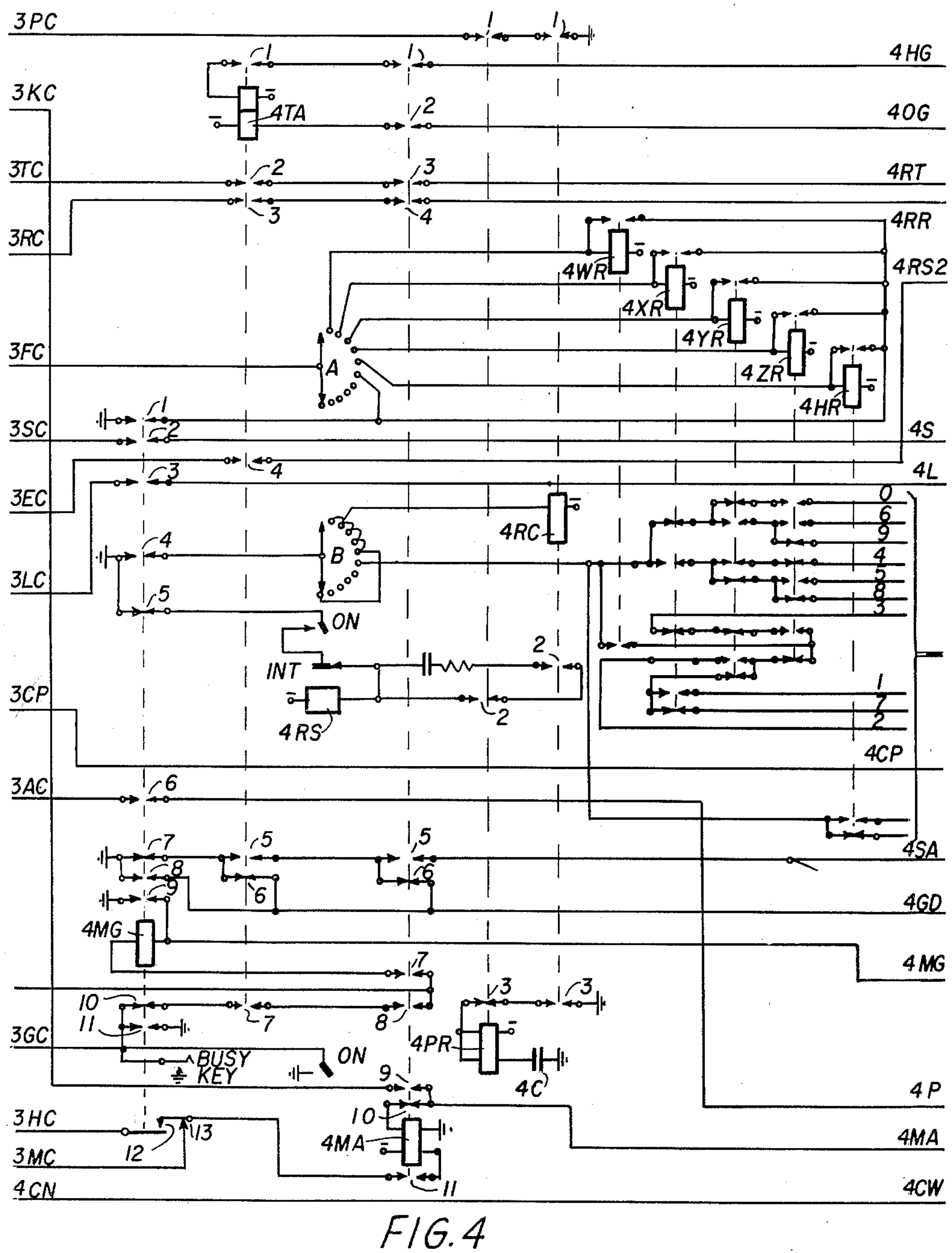
Figure 5:
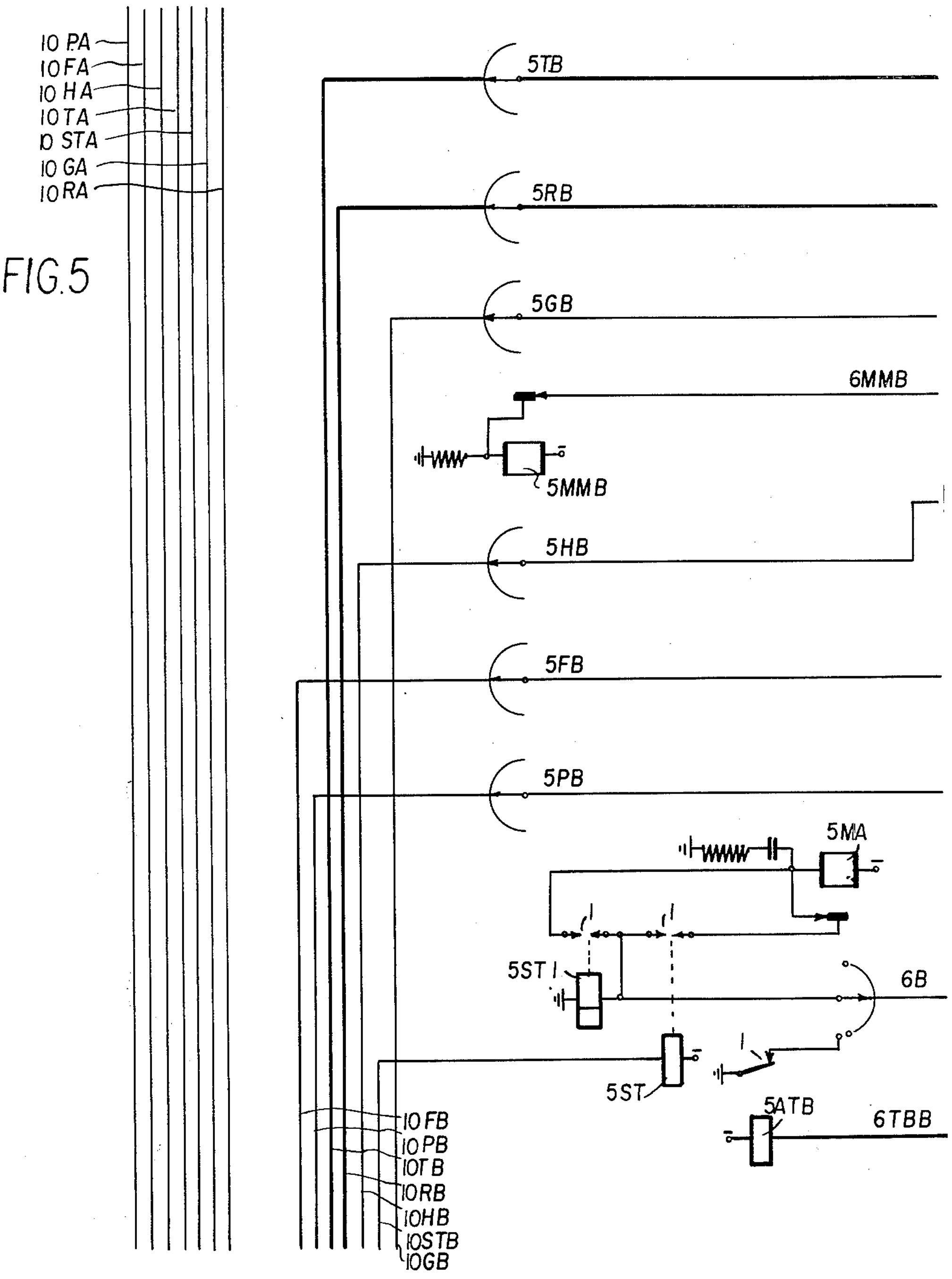
Figure 6:
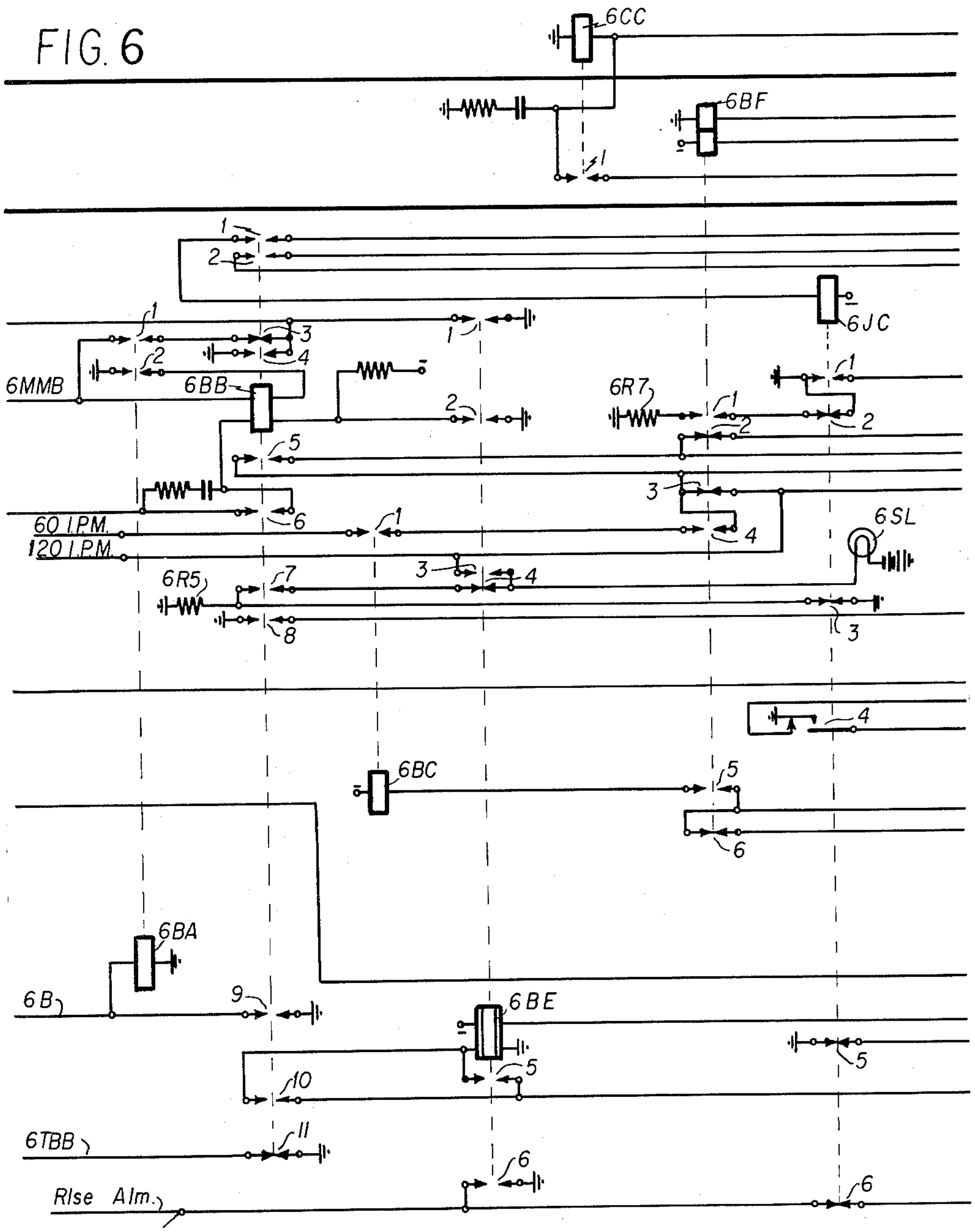
Figure 7:
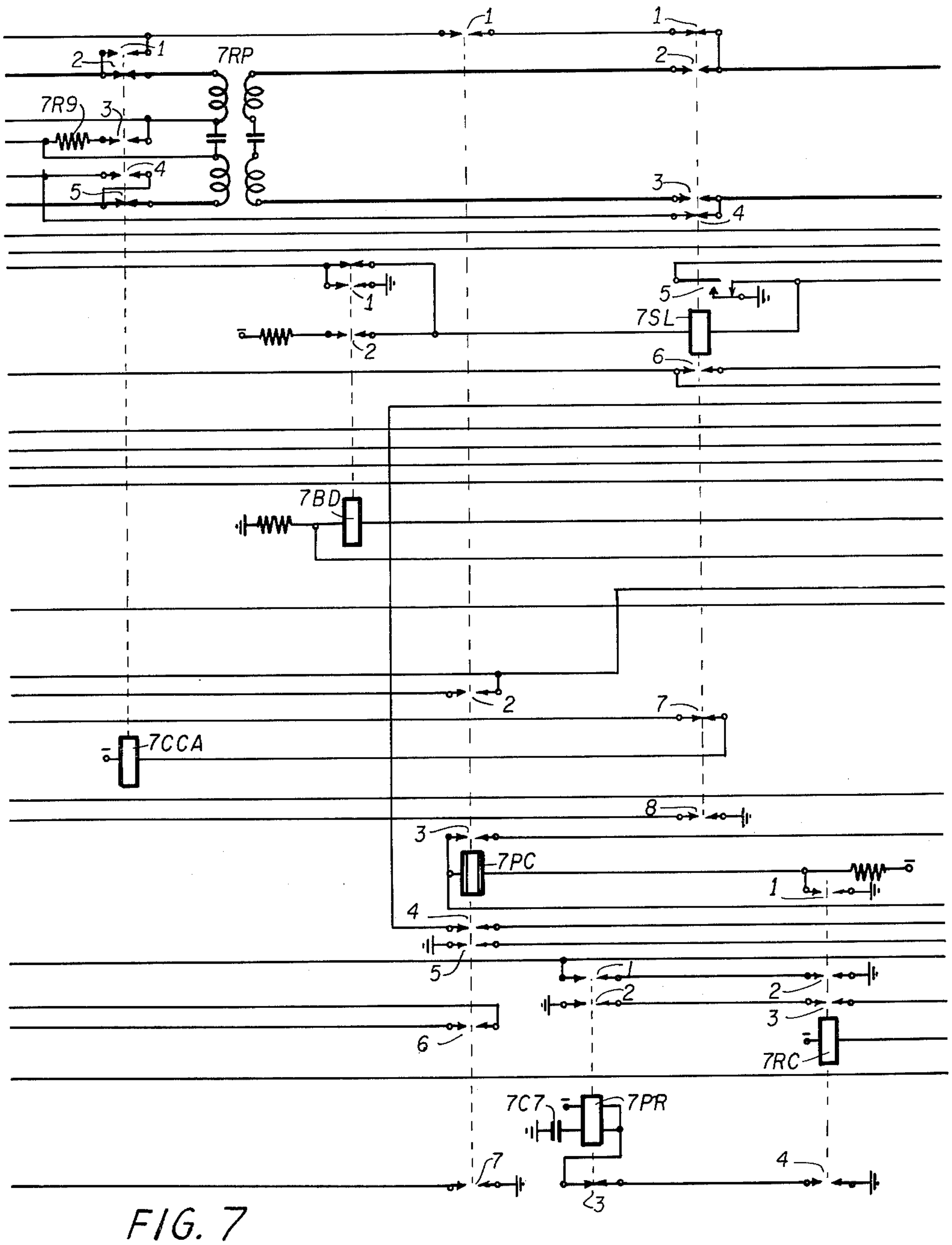
Figure 8:
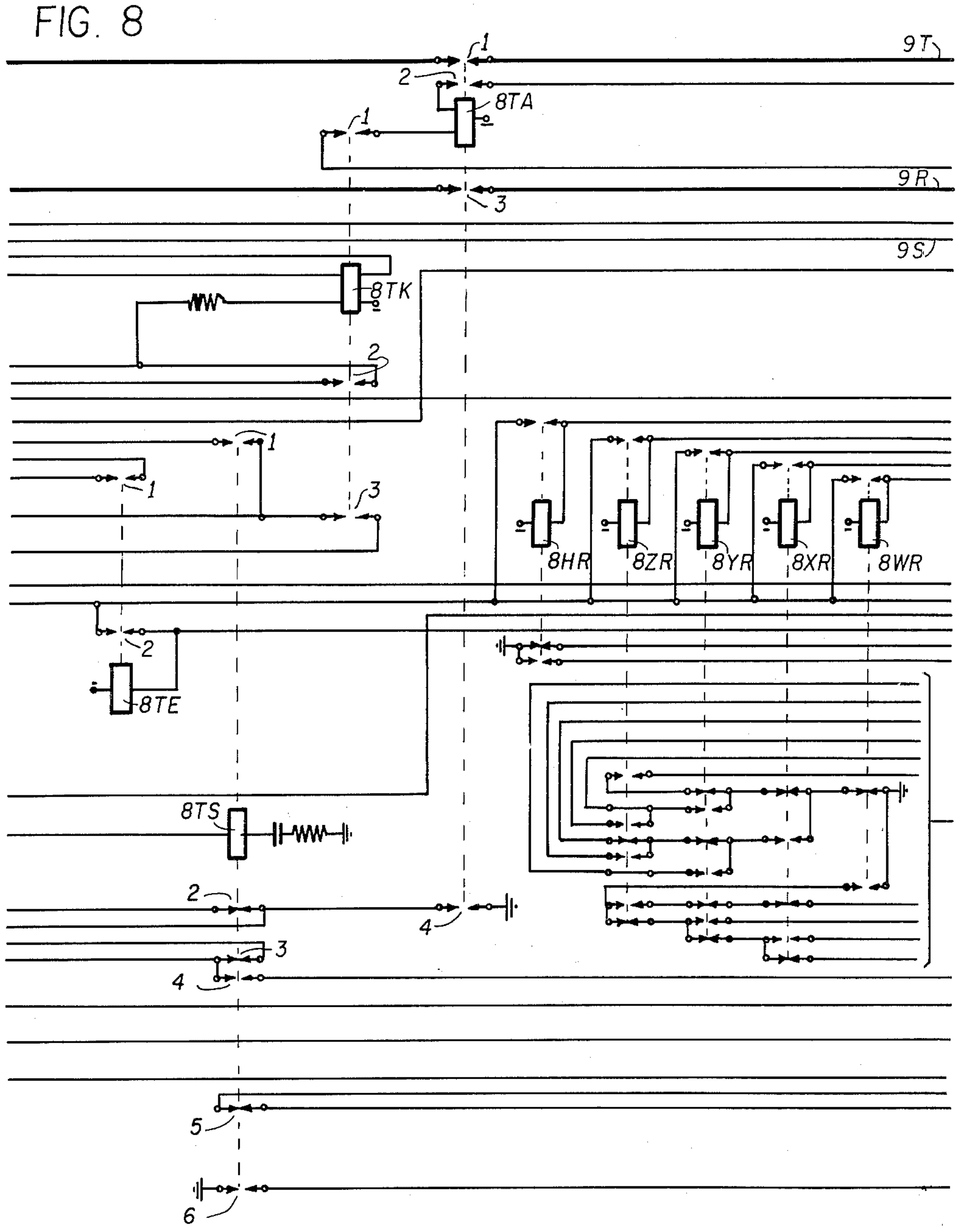
Figure 9:
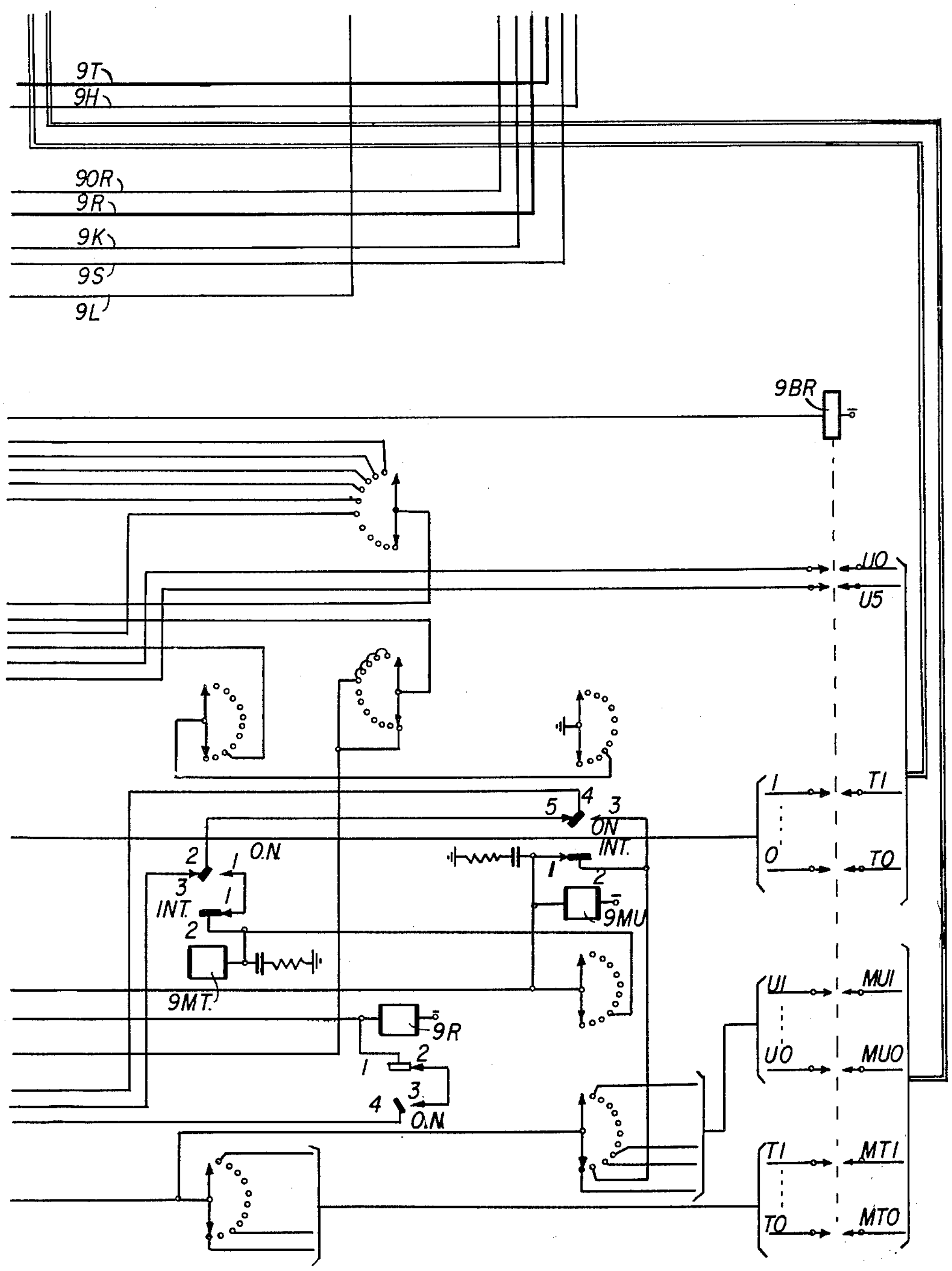
Figure 10:
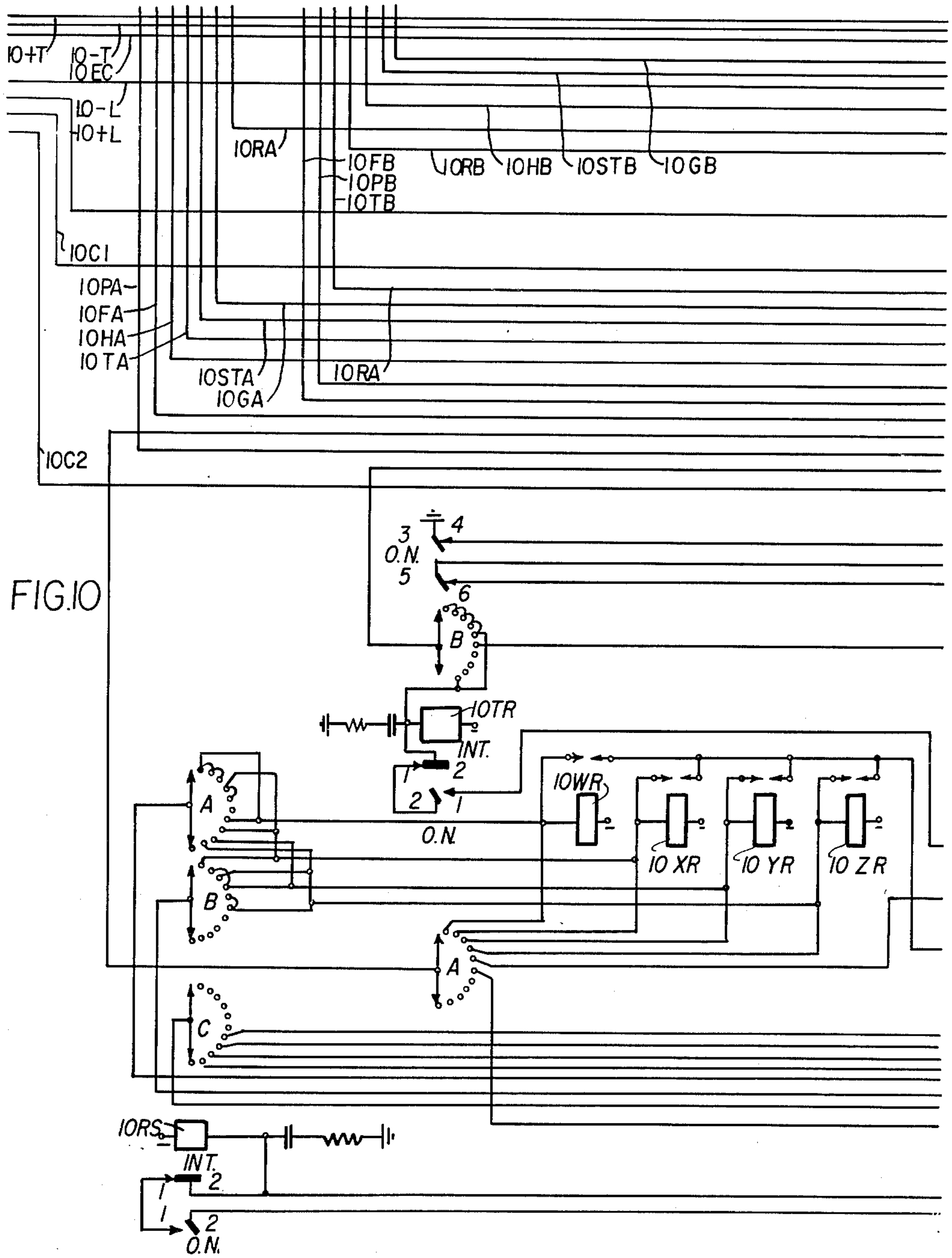
Figure 11:
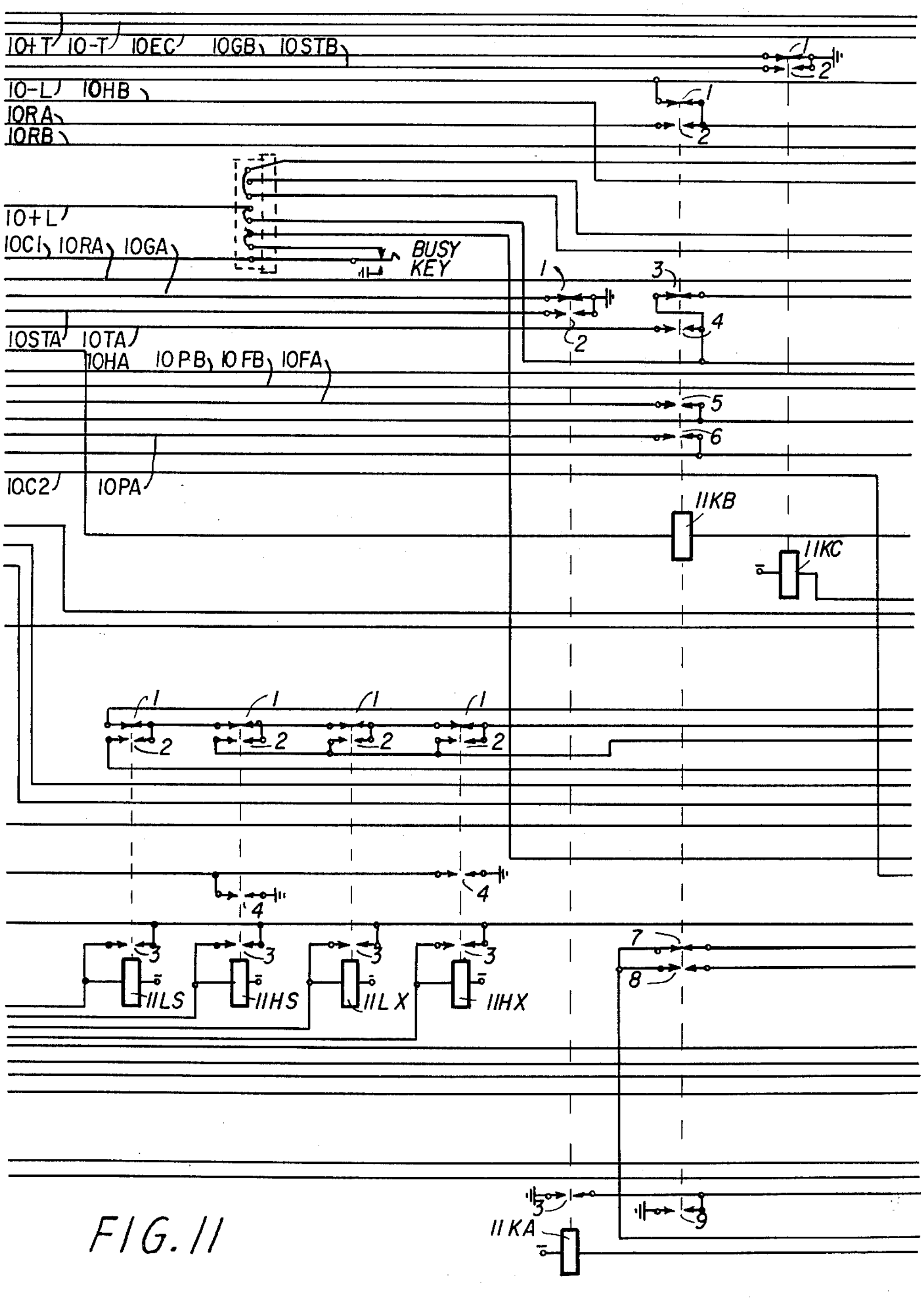
Figure 12:
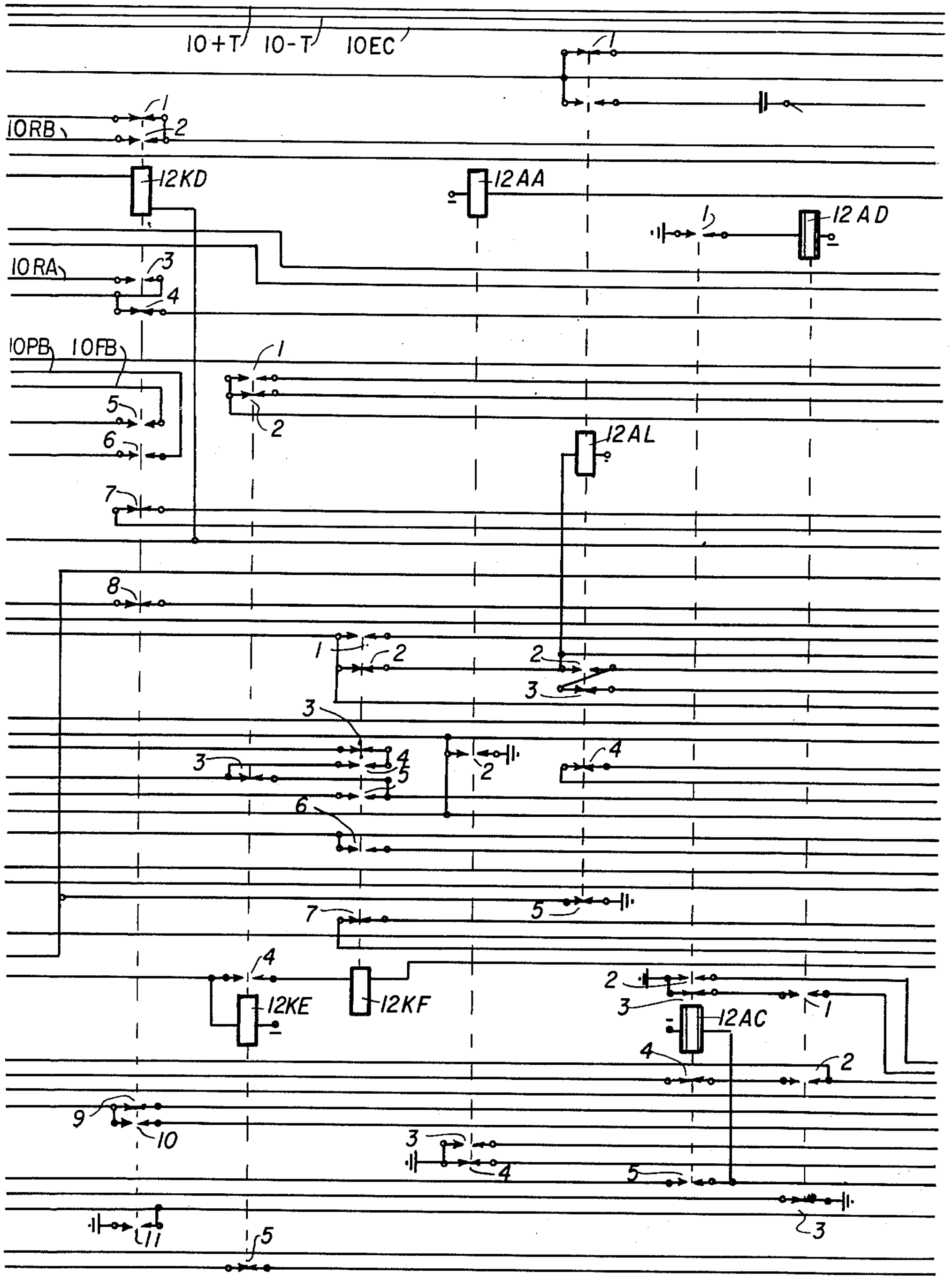
Figure 13:
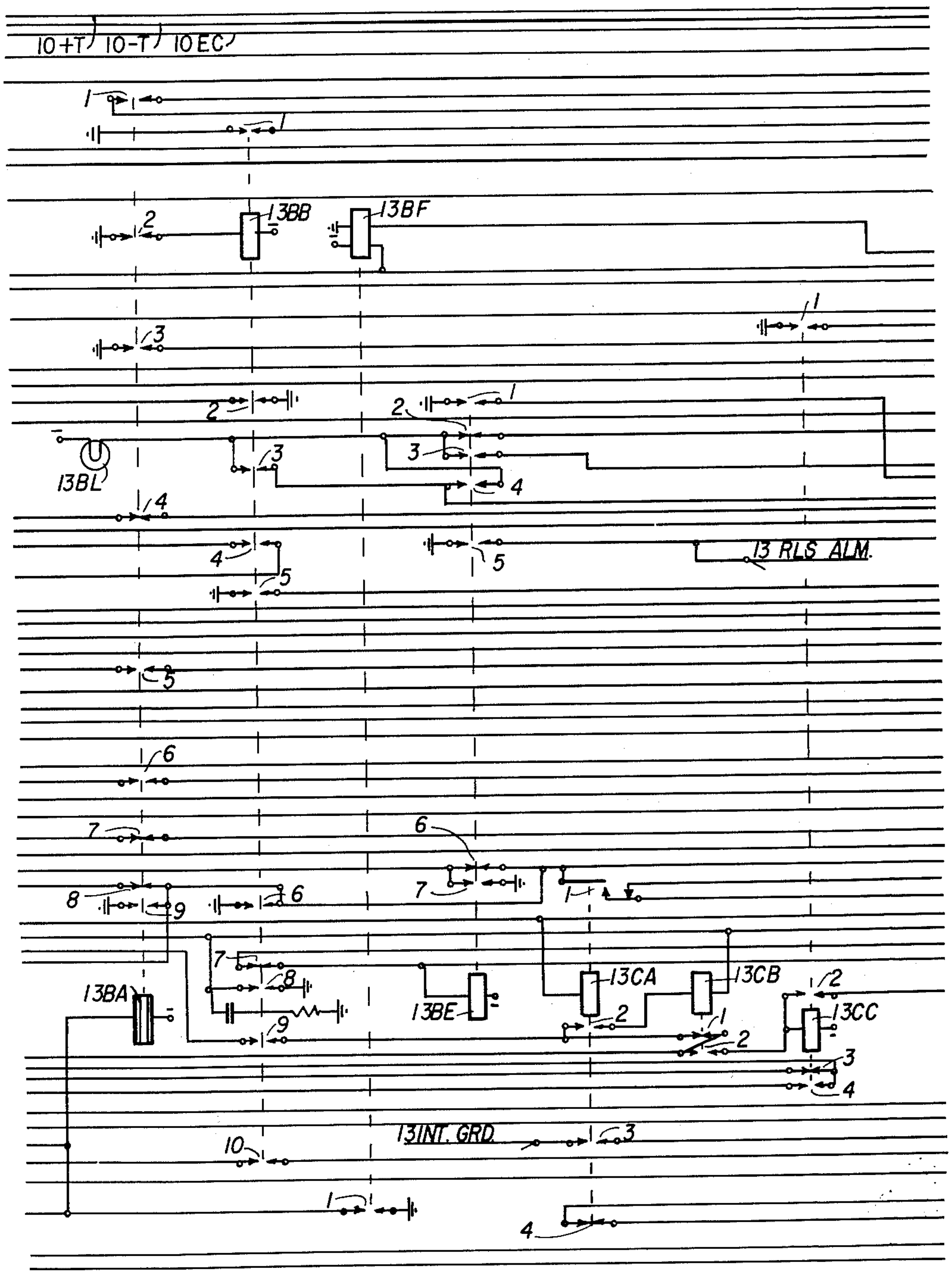
Figure 14:
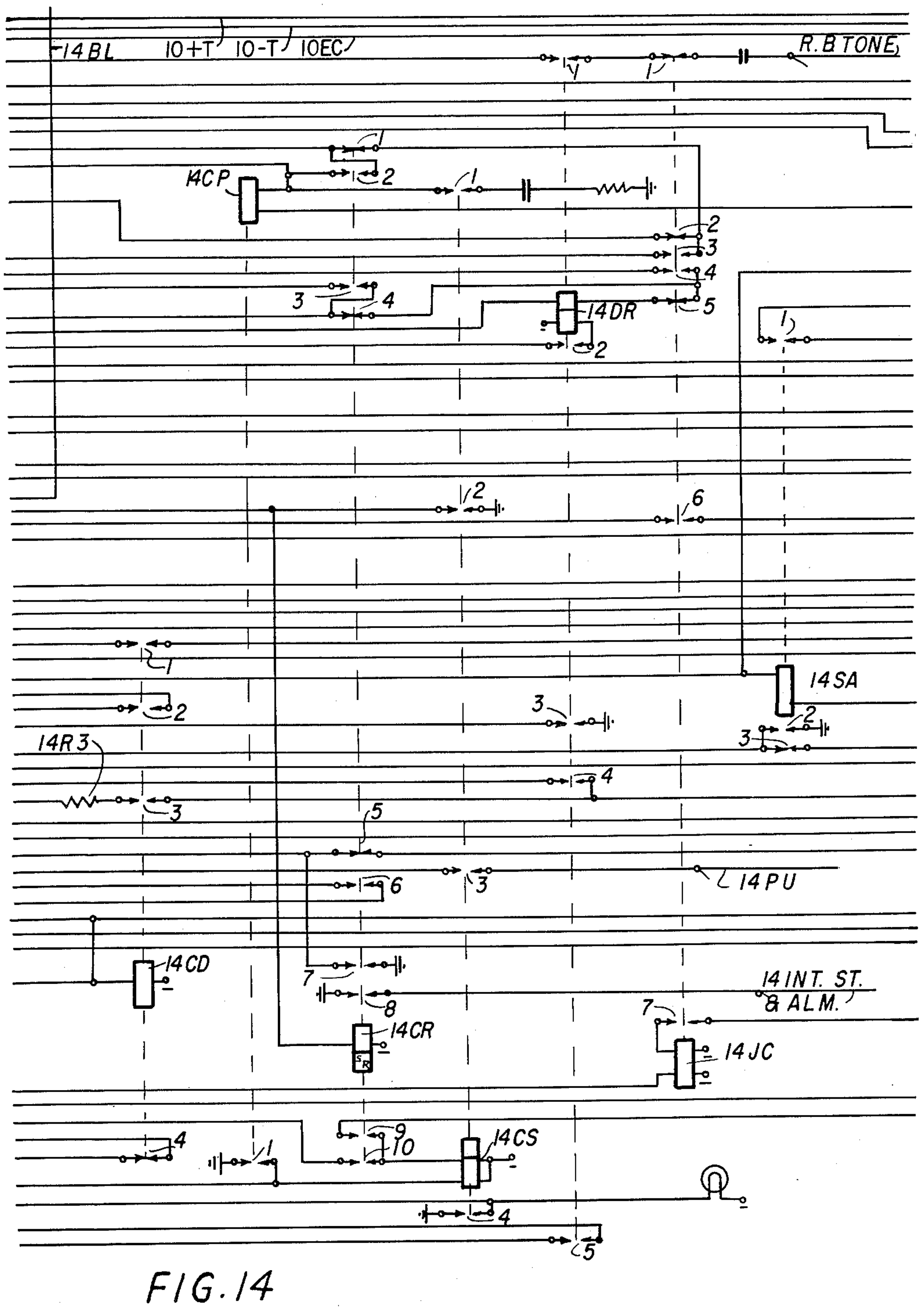
Figure 15:
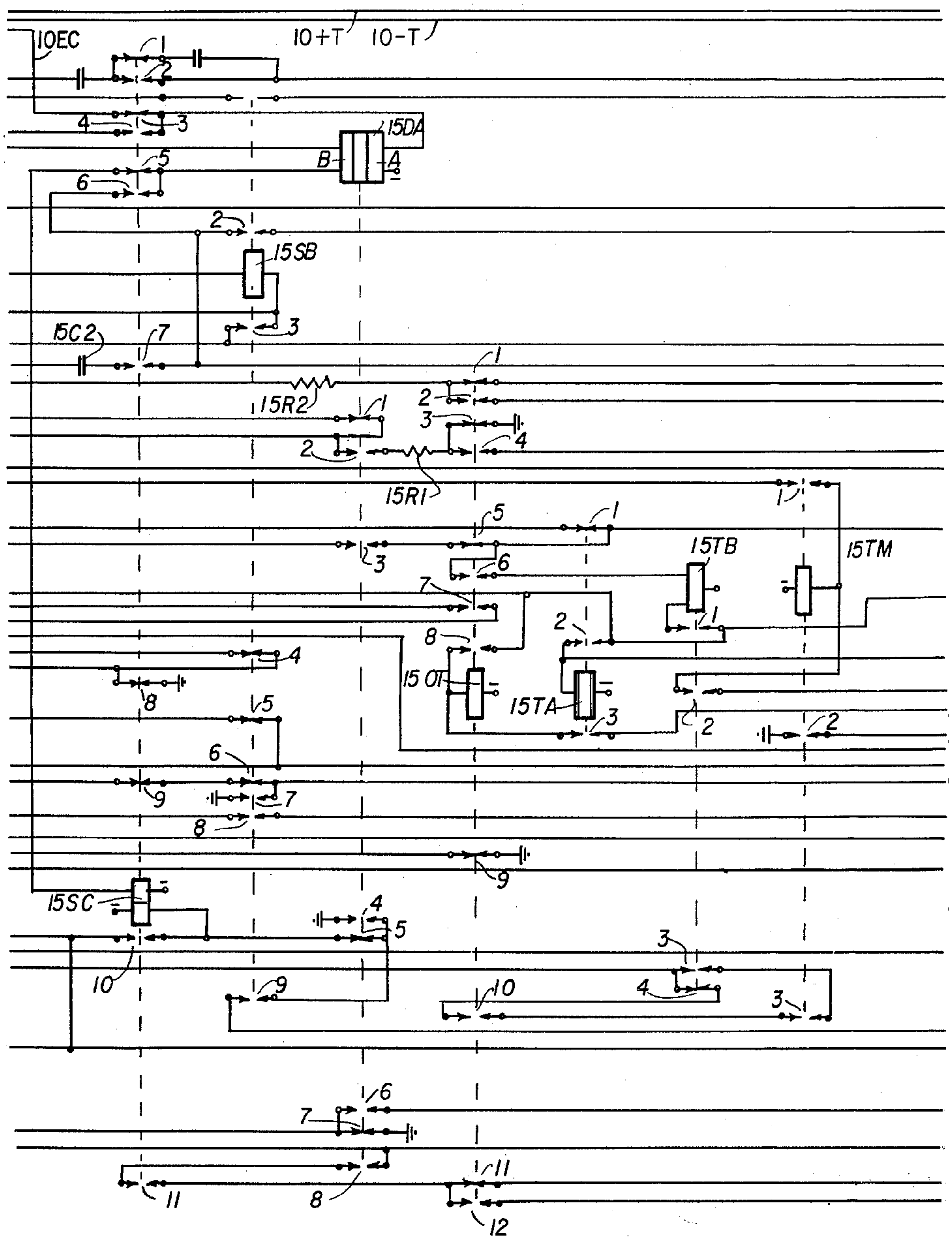
Figure 16:
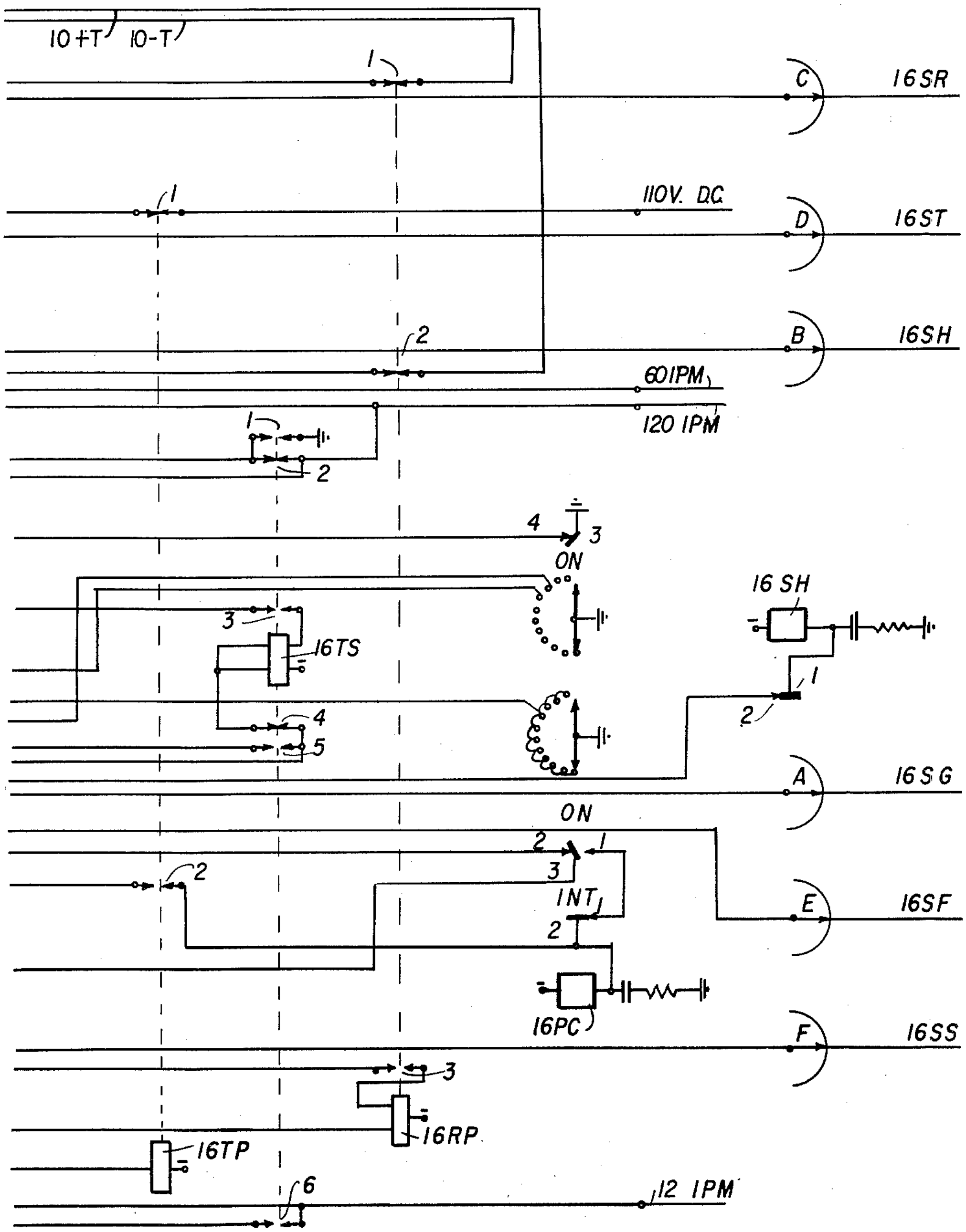
Figure 17:
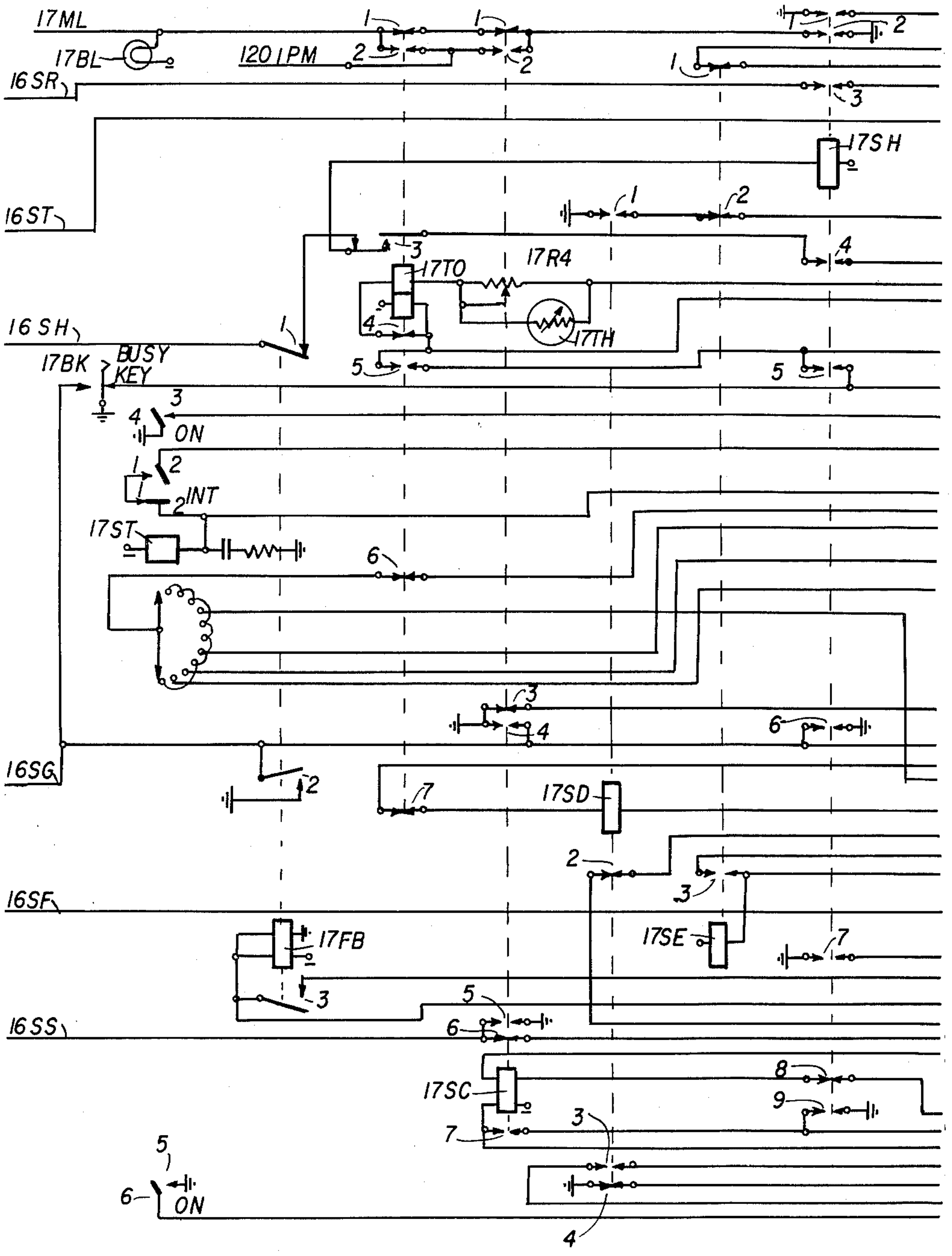
Figure 18:
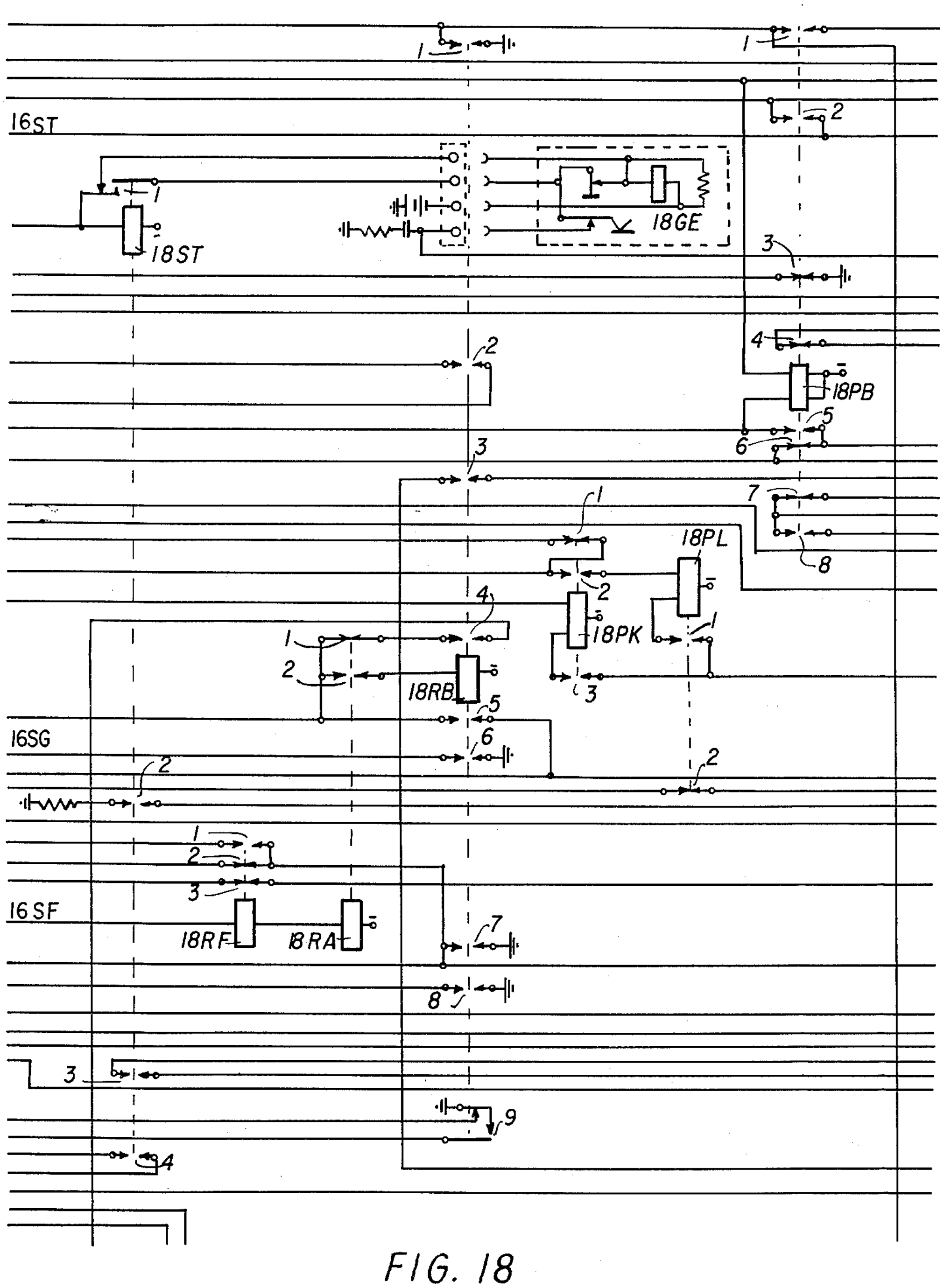
Figure 19:
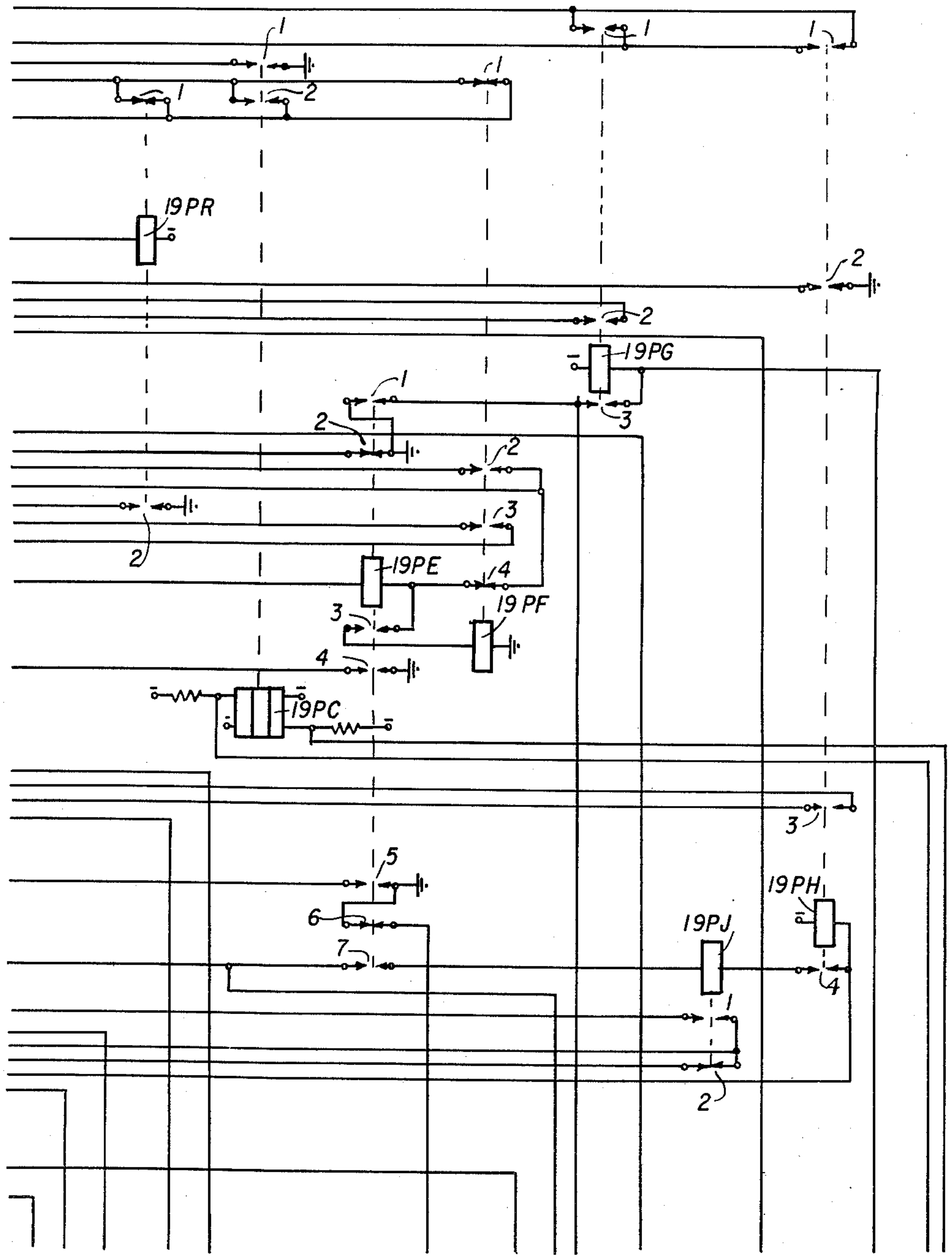
Figure 20:
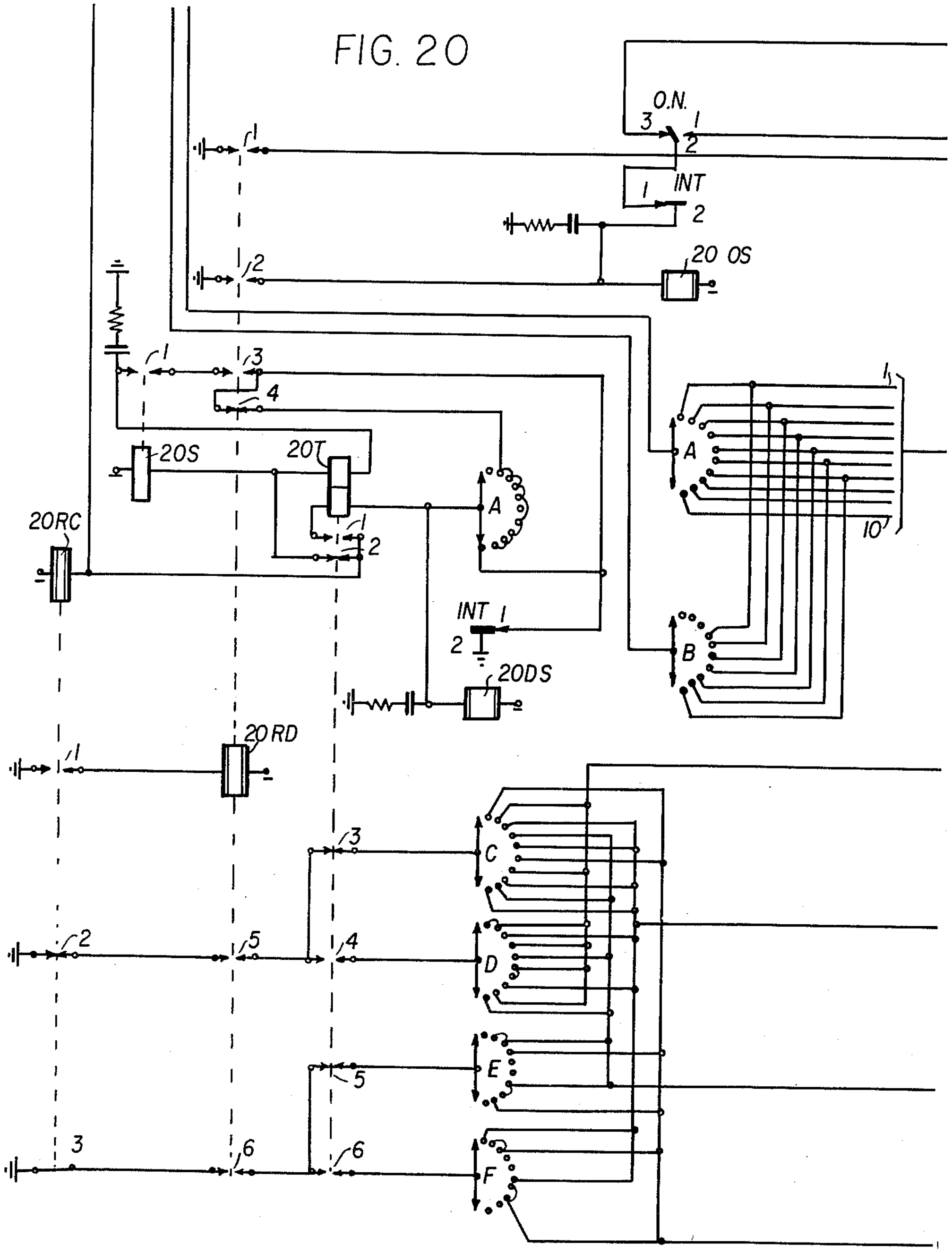

The apparatus schematically illustrated in the different drawings is identified by a functional letter or letters designation which are prefixed by a number corresponding to the figure on which they are located. The contacts associated with a particular relay have been designated by the same letter or letters as the relay followed by a number designating its position from the top of the figure.

The basic purpose of the system of this disclosure is to permit paystation customers in register-sender exchanges to dial short haul (AB) toll calls which are now completed by manual (DSA) operators. Call timing is also automatic.

Paystations in register-sender exchanges are served by a distinct group of line finders and primary selectors. (Class III service.) A paystation repeater is interposed between the line finder and the primary selector to provide the necessary coin control facilities. At present, the paystation customer dials a zero on an AB toll call to cause the register-sender to route the call to a DSA operator.

With the system of this disclosure, the paystation customer will dial the AB toll call directly just as do the regular subscribers. Upon seizure of the primary selector, an idle register-sender is called in. The register-sender performs its usual functions of registering, translating, and sending.

In this new service, it is worthwhile to note that no changes are required in the existing register-senders. The common translator has only to be modified to the extent that it is to provide the directive for Class III service. The rate index is wired into the Class III translator unit to serve as the second and third routing digits. The first routing digit steps the primary selector to seize a "collector circuit" through the banks of the primary selector.

The collector is the basic control unit of this system. It is comparable to the ticketer in toll ticketing systems in that it is inserted in the outgoing trunk and is held throughout the call.

The collector is seized over the (−) side of the line and immediately finds an idle sender. The collector registers the rate index and repulses the digits of the called number into the sender.

When all of the digits have been sent, the register-sender releases, causing the primary selector to switch through the calling loop to the collector. The collector recognizes the director release by the operation of a relay on the (+) side of the line. An "initial fee trunk allotter" is now signalled.

Upon a signal from the allotter, an idle initial fee trunk circuit hunts for the calling collector. Upon switch-through an operator is signalled and the collector transmits the rate index to the trunk circuit.

An idle operator accepts the call which causes the operator position to be connected to the calling initial fee trunk circuit. Upon operator entry, the initial deposit (normally ten cents) is automatically refunded to the paystation customer. The rate index for the dialled call is now displayed on the rate display panel at the operator's position. The operator notes the rate index, requests the deposit of the charges for the initial talking period, monitors the deposit and then releases the connection to the initial fee trunk.

In the meantime, the sender has been waiting for a "start-send" mark from the collector. Upon operator release of the initial fee trunk circuit this mark is transmitted and the sender outpulses the necessary digits to connect the calling and called station. Upon completing this function, the sender releases and is free to serve another collector.

Upon answer supervision, the collector begins timing the call. If the call is terminated within the initial talking period, the switch train is released. All switches, including the collector, are now ready for another call. Thus, on the majority of calls that do not extend into the overtime period, the operator's work time has been reduced to a very minimum.

If the conversation timer in the collector indicates overtime, a circuit is closed to the overtime trunk hunter. Upon switch through to an idle overtime trunk, an operator is signalled and the rate index governing the call in progress is transmitted to the overtime trunk circuit and shown on the rate display panel. When the operator answers, the switch train is locked to the release key at the operator's position and a monitoring circuit is placed across the loop to permit the operator to enter the conversation.

The operator now states the overtime conditions to the calling party and restores the "talk key." The operator again is free to handle other calls. The call now continues until either party releases. The operator is then signalled (120IPM) and the rate and overtime minutes are transmitted to the overtime trunk. A re-ring facility is available if the calling party has released. The operator again operates the "talk key" and notes the display on the rate index and overtime display panels of the rate index and overtime minutes, refers to her bulletin for the overtime charges, requests the deposit of such charges and monitors the deposit. The operator then restores the "talk key" and operates the "release key." The switch train releases and all switches including the collector are free to handle other calls.

Thus, on overtime calls, the operator's work time is limited to two brief entries: an entry at the start of the overtime period to state the overtime conditions, and an entry upon release to request and monitor the deposit of the overtime charges.

DETAILED OPERATION

*Initiation of a call*

A description will now be given of the operation of the operation of the switching apparatus in the exchange and for this purpose it will be assumed that a call is initiated at the paystation marked "class 3" shown in FIG. 22.

Figure 22:
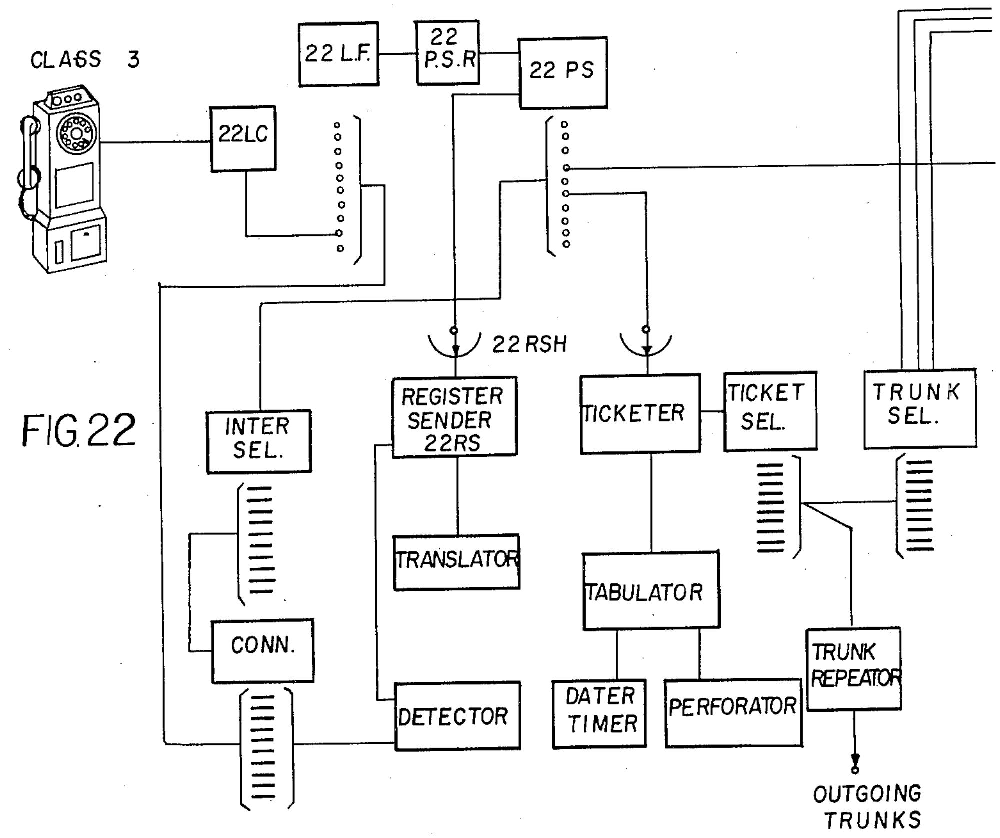
FIG. 22 illustrates in schematic block diagram form the switching equipment, the register-sender, translator, and auxiliary toll ticketing equipment. Also illustrated are two subscriber stations and a paystation.
Figure 24:
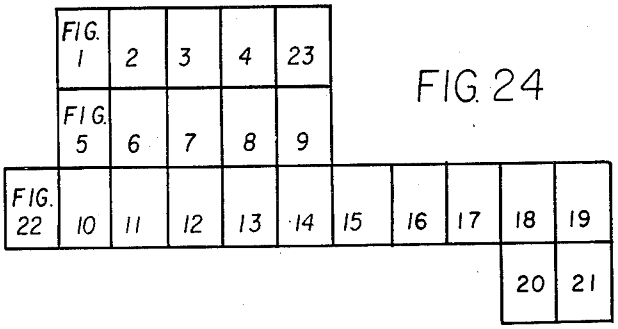
FIG. 24 illustrates the manner of combining FIGS. 1 to 23 inclusive of the drawings to form a unified system.

Referring to the drawings, it will be seen that FIG. 22 schematically illustrates a paystation designated "class 3." This station is connected by way of the line conductors to the line circuit 22LC. This line circuit is schematically illustrated in block diagram form and is connected to the bank contacts of a plurality of line finders, including the line finder 22LF, each of which is individually associated, through a paystation repeater 22PSR, with a primary selector, such as the primary selector 22PS shown. The line finder 22LF illustrated may be of the type disclosed in the Bakker Patent No. 2,289,896, granted July 14, 1942, or of the type shown in the Saunders Patent No. 1,849,694, granted March 15, 1932.

When a calling customer removes the receiver at the paystation telephone instrument, the usual loop circuit including the line conductors and the impulsing springs at the calling station is completed for operating the line circuit 22LC. In response to the completion of the loop circuit the line circuit 22LC initiates operations whereby the distributor will select a line finder, such as 22LF, by way of the rotary switch and the line circuit will mark the terminals of the calling party line in the bank contacts accessible to a group of line finders including the line finder 22LC.

It will be assumed that the rotary switch selects the line finder 22LF.

The line relay in the primary selector now operates to initiate operations whereby the register-sender hunter 22RSH searches for an idle register-sender such as 22RS. In addition, circuits are completed for controlling the line finder to move its wipers to the associated bank terminals to connect with the calling line circuit.

A transfer relay operated in the selector 22PS transfers the calling station loop to the register-sender. The line circuit and the line finder are held in their operated position while the selector is at normal. Dial tone signal to indicate that the customer is to start dialling is supplied from the register-sender.

When the calling customer hears the dial signal, he may manipulate the dial at the paystation in accordance with the code portion and the numerical portion of the called subscriber directory number. The digits dialled by the calling customer are registered in the digit register portion of the register-sender.

A translator will then be utilized in order to obtain the appropriate translation of the digits registered. The routing digits determined by the translator will control the primary selector to route the call to the collector circuit after which the register-sender will cause its own release.

OPERATION

*Seizure of collector circuit*

When this circuit is connected directly to the bank terminals of a primary selector, battery on lead 10C1, extended from the trunk selector over lead 10C2 through contacts 13BA8 and 13BE6, marks this circuit idle.

When seized, ground on lead —10L completes a circuit through contacts 11KB1, 12KD1, 14CR1 and 14JC2 to relay 12AA. Relay 12AA operates and completes, at contacts 12AA3, a circuit for relay 13BA. Relay 13BA operates, at contacts 13BA9 connects ground potential to lead 10C1 to mark this circuit busy to the primary selector; connects ground potential at contacts 13BA2 to relay 13BB; contacts 13BA5 complete a circuit from ground potential at contacts 15SC8, 13BA5, 12AL3 to place relay 14SA in series with magnet 16SH through contacts 15SB5 and completes a path through contacts 15SB6, 15SC9, 13BA6, 12AL4, 14SA3 and contacts 1 and 2 of switch 16SH from lead 16SG to magnet 16SH. Relay 13BB operates; extends ground potential through contacts 13BB1 to the coil B of relay 15DA, which does not operate at this time; lights the busy lamp from ground potential at contacts 13BB2 through contacts 12KE2, 15DA1, and 13BE2; grounds lead 14BL at contacts 13BB3 to light the busy lamp on the monitor panel; and extends ground potential from contacts 12AA3 at 13BA4 through relays 11KB and 12KD to leads 10HA and 10HB, respectively.

SENDER HUNTER OPERATION (OPERATED: RELAYS 12AA, 13BA AND 13BB)

The sender hunter switch 16SH is a rotary switch, arranged for absence-of-ground searching, non-homing operation, and self-interrupted stepping used to select an idle sender. This switch is thus always associated with one of the senders, unless at normal, but the associated sender may be either idle or busy. The selection of an idle sender does not take place until the collector is seized and relay 13BA operates.

The SG leads, such as for example 16SG, connected to level A of switch 16SH are the marking leads utilizing absence of ground as an idle marking and ground as a busy marking. The SH leads, such as for example 16SH, are connected to the level B of switch 16SH, and to a battery-connected relay 17SH in the sender, which operates in series with relay 15SB and, when operated, extends the loop across leads −10T and +10T to seize the trunk circuit. Leads 16SR and 16ST on levels C and D of switch 16SH are the ring and tip leads of a sender respectively. The digits are pulsed into a sender over lead 16SF via the level E of switch 16SH. Lead 16SS is for stop-dial, busy, and completion of sending control signals.

An idle sender is selected in the following manner: When relay 13BA operates, magnet 16SH is completed to ground through relay 14SA in multiple with lead 16SG. If the sender associated with switch 16SH at this time is busy, direct ground on lead 16SG short circuits relay 14SA and the circuit to magnet 16SH is closed. Rotary switch magnet 16SH operates, opens its own circuit, restores, and steps the wipers to the next bank contact. If the next sender is also busy, rotary switch magnet 16SH reoperates and again functions as described above. If the sender is idle, or when an idle sender is found, an absence of ground on lead 16SG allows relay 14SA to operate in series with rotary switch magnet 16SH. Rotary switch magnet 16SH does not operate in series with relay 14SA. Relay 14SA when operated opens the circuit to rotary switch 16SH from lead 16SG, connects ground to lead 16SG to mark the sender busy and completes a circuit to relay 15SB at contacts 14SA1 in series with the battery-connected relay 17SH in the sender. Relay 15SB operates, locks through its "X" contacts 15SB3, closes the loop across leads +10T and −10T to seize the succeeding trunk selector, opens the circuit of relay 14SA, closes a multiple ground to lead 16SG, and closes lead 16SS to relay 15SC. Relay 14SA restores.

*In pulsing*

PULSING OF THE FIRST DIGIT (OPERATED: RELAYS 12AA, 13BA, 13BB AND 15SB)

The digits are pulsed into this circuit as ground pulses on lead −10L. On the first pulse of the first digit relay 12AA restores, closes ground from contacts 12AA4 through contacts 13BB10, and 14CD4 to relay 12AC and opens the circuit to relay 13BA at contacts 12AA3. Relay 12AC operates, closes the circuit at contacts 12AC5 to magnet 10RS and closes the circuit at contacts 12AC1 and 12AC2 to relays 12AD and 13CA respectively. Relay 13AC operates and locks in series with relay 13CB (which is now short-circuited by ground at the contacts of 12AC). Relay 12AD operates. At the end of the first pulse relay 12AA reoperates, opens the circuit to relay 12AC and magnet 10RS and closes the circuit to relay 12BA. Magnet 10RS restores, steps to the first bank contact and closes its ON1 and ON2 springs, which remain closed until the switch returns to its normal position. Relay 12AA follows the succeeding pulses of the first digit, pulsing magnet 10RS which steps the switch to the position corresponding to the pulsed-in digit in the same manner as described above. Relays 13BA and 12AC remain operating during pulsing due to their slow-to-release characteristics.

At the completion of the pulsing of the digit, relay 12AA reoperates, opens the circuit to relay 12AC and closes the circuit to relay 13BA. After its slow-to-release interval, relay 12AC restores, removes the short-circuit from relay 13CB, opens the circuit of relay 12AD, and closes the circuit to one or two of the codel relays 10WR, 10XR, 10YR, 10ZR. The codel relays operate and lock.

The codel relays operate as follows:

| Digit dialled: | Operated relay(s) |
|---|---|
| 1 | 10WR and 10XR. |
| 2 | 10WR and 10YR. |
| 3 | 10WR and 10ZR. |
| 4 | 10XR and 10YR. |
| 5 | 10XR and 10ZR. |
| 6 | 10YR and 10ZR. |
| 7 | 10WR. |
| 8 | 10XR. |
| 9 | 10YR. |
| 0 | 10ZR. |

The marking ground of the above codel relays is extended to the bank contacts of switch 10TR, level A, to provide a unit digit of the rate index indication.

Relay 14CB operates in series with relay 13CA and prepares the circuit to relay 13CC. Relay 12AD restores, closes the circuit to magnet 10RS, and removes ground from the wipers of switch 10RS, levels A and B. Magnet 10RS operates, opens its own circuit, restores, steps to the next bank contact, reoperates and continues stepping, as described above, until the normal position is reached. The ON1 and ON2 springs operate and open further the circuit to magnet 10RS to prevent the magnet from reoperating, when the INT1 and INT2 springs restore.

PULSING OF THE SECOND DIGIT (OPERATES: RELAYS 12AA, 13BA, 13BB, 15SB, 13CA, AND 13CB AND ONE OR TWO OF THE 10WR–10WZ RELAYS)

On the first pulse of the second digit, relay 12AA restores, opens the circuit to relay 13BA, and closes the circuit to relay 12AC. Relay 12AC operates, closes circuits to relays 13CC and 12AD, and closes the circuit to magnet 10RS. Relay 13CC operates and locks in series with relay 14CD (which is short-circuited by ground at the contacts of 12AC). During pulsing of the second digit, which should be a "7," "8," "9," or "0"; relays 12AA, 13BA, 12AC, 12AD, and magnet 10RS function as described in the preceding section.

At the completion of the second digit, and after its slow-to-release interval, relay 12AC restores, removes the short-circuit from relay 14CD, and closes a circuit through the wiper of switch 10RS, level C, to one of the following relays: 11LS, 11HS, 11LX, or 11HX. (If a digit "7" was dialled, the circuit is closed to 11LS, digit "8" to 11HS, digit "9" to 11LX, and digit "0" to 11HX.) The appropriate relay operates, locks, and provides the following indications: Relay 11LS or 11LX operated indicates a low rate call to the operator, while 11HS or 11HX operated indicates a high rate call. Relays 11LS and 11HS indicate to the sender that the call is to a step-by-step office, while 11LX and 11HX indicate a crossbar office. Relay 14CD operates, closes ground at contacts of 12AA, through resistor 14R3 and over lead 16SF, to a pulse-following relay such as 18RA in the sender, opens further the circuit to relay 12AC to prevent relay 12AC from operating during pulsing of the succeeding digit, and closes ground through the number one winding of relay 14DR to lead +10L. Relay 12AD restores and switch 10RS homes in the same manner as previously described.

PULSING OF THIRD AND SUCCEEDING DIGITS OPERATED: RELAYS 12AA, 13BA, 13BB, 15SB, 13CA, 13CB, 13CC, 14CD, ONE OR TWO OF THE 10WR–10WZ RELAYS AND ONE OF THE 11LS, 11LX, 11HS AND 11HX RELAYS

Relay 12AA follows the pulses of the third digit, opening and closing ground through resistor 14R3 to lead 16SF. Resistance ground pulses on lead 16SF are extended to the sender circuit where they are registered and stored. The succeeding digits are pulsed into the sender in the same manner as the third digit.

INCORRECT DIRECTIVE OR SENDER FAILS TO FIND AN IDLE SENDER (OPERATED: RELAYS 12AA, 13BA, 13BB, 15SB, 13CA, 13CB, 13CC, AND 14CD)

As mentioned in penultimate preceding section, the second digit pulsed into this circuit should be one of the "7" to "0" digits. If the register-sender, for any reason, pulses out an incorrect directive (second digit other than "7"–"0"), the corresponding 11LS, 11LX, 11HS, or 11HX relay will not be operated and when relay 14CD operates at the end of the second digit, the circuit is closed to relay 12AL. Relay 12AL operates, locks, closes busy tone to lead −10L, removes ground from lead 10HA or 10HB, and opens the circuit to relay 15SB. Relay 15SB restores, opens the circuit to relay 15SC from lead 16SS, removes ground from lead 16SF, and opens the loop to the trunk selector. These functions of relay 15SB release the sender and the trunk selector. Relay 12AA will follow the pulses of the third and succeeding digits, but these pulses will have no further effect on this or the associated circuit. When the register-sender releases upon completion of pulsing, busy tone on lead −10L is extended to the calling paystation.

If the sender hunter fails to find an idle sender by the time the second digit is pulsed in, relay 15SB is not operated, and when relay 14CD operates at the completion of the second digit, the circuit is closed through the unopened contacts of 15SB4 of relay 15SB to relay 12AL. Relay 12AL operates and functions as described above, except that relay 15SB has not been previously operated.

REGISTER-SENDER RELEASE (OPERATED: RELAYS 12AA, 13BA, 13BB, 13CA, 13CB, 13CC, 14CD, ONE OR TWO OF THE 10WR–10WZ RELAYS, AND ONE OF THE 11LS, 11LX, 11HS, 11HX RELAYS)

When all digits have been pulsed out by the register-sender, the register-sender releases, switches the line lead to the paystation loop and removes ground from −10L. (If this circuit is connected to an interoffice trunk, the preceding trunk repeater repeats the above-mentioned function of the register-sender to this circuit.)

The loop over leads +10L and −10L closes a circuit to the number one winding of relay 14DR in series with relay 12AA. Relay 14DR operates, locks through its "X" contacts 14DR2 on its number two winding, closes ring-back tone over lead −10L to the calling line, closes direct ground to lead 16SF to prepare the sender for sending the digits, and closes the circuit of relay 11KA. Relay 11KA operates and closes ground to lead 10STA.

SWITCH-THROUGH TO INITIAL FEE TRUNK (OPERATED: RELAYS 12AA, 13BA, 13BB, 15SB, 13CA, 13CB, 13CC, 14CD, 14DR, 11KA, ONE OR TWO OF THE 10WR–10ZR RELAYS AND ONE OF THE 11LS, 11LX, 11HS, AND 11HX RELAYS)

Ground on lead 10STA starts the functions of the initial fee trunk allotter which searches for an idle initial fee trunk. When the initial fee trunk allotter finds and seizes an idle initial fee trunk, the initial fee trunk initiates the functions of the collector hunter which searches for the calling collector and signals the operator. Ground through relay 11KB on lead 10HA provides a stopping circuit for the collector hunter. When the collector hunter finds this collector, battery on lead 10HA from the initial fee trunk closes relay 11KB. Relay 11KB operates, closes the circuit 12KE, closes lead 10PA to magnet 10TR, closes lead 10FA to the wiper of level A, switch 10TR, extends the calling line loop to the initial fee trunk, opens the circuit to relay 12AA, closes a multiple ground to relay 13BA, and opens the circuit of relay 11KA. Relay 12AA restores. Relay 11KA restores and removes ground from lead 10STA.

Relay 12KE operates, locks in series with relay 12KF (which is now short-circuited by direct ground through the operated springs of 11KB) transfers the busy lamp 13BL from direct ground to 60IPM ground through resistor 15R2, and if the call is to a step-by-step office (relay 11LS or 11HS operated), removes direct ground from lead 16SF, thus removing the short-circuit from resistor 14R3. Ground through resistor 14R3 on lead 16SF, at this time, indicates to the sender to pulse out all but the last two digits. The sender pulses out digits as loop pulses over leads 16SR and 16ST and −10T and +10T, respectively, with no further effects on the functions of this circuit. The busy lamp flashes dimly. If the call is to a crossbar office, with relay 11LX or 11HX operated, the direct ground is maintained on lead 16SF and the sender will not pulse out the stored digits at this time. (The above feature is to avoid time-out by the crossbar equipment should the initial fee operator be associated with the calling line for a longer period of time.)

INITIAL OPERATOR'S ENTRY (OPERATED: RELAYS 13BA, 13BB, 15SB, 13CA, 13CB, 13CC, 14CD, 14DR, 11KB, ONE OR TWO OF THE 10WR–10ZR RELAYS AND ONE OF THE 11LS, 11LX, 11HS, 11HX RELAYS)

As mentioned in the preceding section, when the initial fee trunk is seized, it signals the operator (lights the answer lamp at the operator's position). The operator operates her accept key, which causes the initial fee position equipment to search and switch through to the initial fee trunk calling for service. The connection is now established from lead −10L and +10L over lead 10RA and 10TA respectively, through the initial fee trunk and the initial fee position equipment, to the operator. The initial fee trunk closes a pulse of −110V to the line leads to refund the initial fee (10¢ deposited by the calling party to access the line equipment) and closes six ground pulses to lead 10PA. The −110V may also be closed by the operator by operation of the refund key. On each ground pulse over lead 10PA, magnet 10TR operates and opens its INT1 and INT2 springs and, when ground is removed from lead 10PA, magnet 10TR restores and steps the wipers to the next bank contacts. The ON springs are operated on the first step of the switch. As the switch steps over contacts 1 through 4 the rate marked by relay 10WR–10ZR is extended over the wiper of level A and over lead 10FA to the operator's control circuit where the marking is translated into the decimal form. As the level A wiper is stepped to the fifth bank contact, ground at this contact (11HS or 11HX operated) indicates to the operator's control circuit a high rate call. Absence-of-ground on this contact (11LS or 11LX operated) indicates a low rate call. The decimal markings are extended by the operator's control circuit to the toll board where the rate is indicated by the lit lamps. On the last pulse (sixth) on lead 10PA, magnet 10TR operates and when the pulse is removed, steps to the sixth bank contact and closes lead 10FA to relay 14JC. Ground on lead 10FA completes the circuit to the number one winding of relay 14JC. Relay 14JC operates, locks on its number two winding, removes ring-back tone from the calling line, prepares the circuit to relay 13BF, and opens the circuit to the number one winding of relay 14DR. The operator instructs the calling party to deposit the initial fee (charges for the first three minutes) and monitors while the calling party is depositing coins.

OPERATOR DISCONNECT (OPERATED: RELAYS 13BA, 13BB, 15SB, 13CA, 13CB, 13CC, 14CD, 14DR, 11KB, 14JC, ONE OR TWO OF THE 10WR–10WS RELAYS, AND ONE OF THE 11LS, 11LX, 11HS, OR 11HX RELAYS)

When the coins have been deposited, the operator operates her release key which releases the initial fee position equipment and the initial fee trunk. From this point on, the operator has no control of the connection and will receive no supervision of the progress of the call unless a three minute mark of conversation is reached. (See succeeding sections.)

When the initial fee trunk restores, battery is removed from lead 10HA. Relay 11KB restores, closes the line loop to relay 13BF, opens the circuit to relay 13BA, removes the short-circuit from relay 12KF, closes the circuit to magnet 10TR, opens the loop to the initial fee trunk, opens lead 10PA from the wiper of switch 10TR, level B, and opens lead 10FA from the wiper of switch 10TR, level A. Relay 13BA is slow-to-release and does not release immediately. Relay 13BF operates and closes a circuit to relay 13BA to prevent relay 13BA from restoring. Relay 12KF operates in series with relay 12KE, closes the circuit to magnet 10TR, opens the circuits to relays 13CA and 13CB and if the call is to a step-by-step office (relay 11LS or 11HS operated), closes direct ground to lead 16SF to indicate to the sender to send out the two remaining digits, or if the call is to a crossbar office (relay 11LX or 11HX operated), removes the direct ground from lead 16SF to indicate to the sender to send out all but the last two digits. Relays 13CA and 13CB restore. Magnet 10TR operates, opens its own circuit, restores, steps to the next bank contact, closes its own circuit, reoperates, and continues stepping in this manner until the normal position is reached. When the normal position is reached, the ON springs operate, open further the circuit to magnet 10TR to prevent magnet 10TR from reoperating when the INT1 and INT2 springs restore, and close direct ground to lead 16SF to indicate to the sender to pulse out all digits, if the call is to a crossbar office. (The signals over lead 16SF to the sender are as follows: digits are pulsed into the sender as resistance ground pulses; direct ground after completion of pulsing prepares the sender for sending out the digits; direct ground is then removed and resistance ground on lead 16SF causes the sender to start sending; if the resistance ground is maintained on lead 16SF the sender pulses out all but the last two digits; direct ground on lead 16SF after the sending process has started indicates to the sender out all digits.)

STOP-DIAL AND BUSY CONDITIONS (OPERATED: RELAYS 13BA, 13BB, 13CC, 14CD, 14JC, 15SB, 14DR, ONE OR TWO OF THE 10WR–10ZR RELAYS, AND ONE OF THE 11LS, 11LX, 11HS, AND 11HX RELAYS, 12KE AND EITHER 12KF AND 13BF OR 11KB, 13CA AND 13CB)

When a delay in pulsing is required by the succeeding equipment, ground is closed to lead 10EC. Relay 15DA, having both of its windings energized, operates, closes ground to lead 13RLS ALM, and closes ground to lead 16SS. Ground on lead 16SS causes the sender to stop pulsing the outgoing loop.

When the stop dial condition is removed, lead 10EC is opened and relay 15DA restores, removes ground from lead 13RLS ALM, and removes ground from lead 16SS to indicate to the sender that the sending may proceed.

If the stop-dial condition persists, relay 15DA maintains ground on lead 16SS. After an interval of approximately 5 seconds the time-out relay in the sender operates and removes battery from lead 16SH. Relay 15SB restores, closes a circuit to relay 12AL, opens the loop to the succeeding equipment to release that equipment, removes ground from lead 16SG, opens leads 16SF and 16SS, thus removing completely the connection to the sender, which restores to normal. Relay 12AL operates, locks, closes busy tone to the calling line and removes ground from lead 10HA and 10HB, and if the operator is still holding the connection, opens the circuit to relay 11KB and removes the short from relay 12KF. Relay 12KF operates and opens the circuit to relays 13CA and 13CB which restore. Relay 11KB restores and functions as described in the preceding section, except that the short on relay 12KF is already removed by relay 12AL. The status of the circuit is now the same in both cases (operator releases when busy is encountered or busy is encountered before the operator releases).

When a busy condition is encountered, 30, 60, or 120IPM ground is closed to lead 10EC. Relay 15DA follows the pulses over lead 10EC and in turn pulses lead 16SS. The sender recognizes the busy condition and removes battery from lead 16SH. This circuit then functions as described above.

COIN REFUND (OPERATED: RELAYS 13BA, 13BB, 13CC, 14CD, 14DR, 14JC, 12KE, 12AL, ONE OR TWO OF THE 10WR–10ZR RELAYS, ONE OF THE 11LS, 11LX, 11HS, 11HX RELAYS, 12KF AND 13BF OR 11KB, 13CA AND 13CB)

Assuming that the initial fee was deposited and the operator is out of the connection when the calling party disconnects upon receiving busy tone as described in the preceding section, the line loop is opened to relay 13BF. Relay 13BF restores, and opens the circuit to relay 13BA. Relay 13BA restores, closes the circuit to relay 14CR, and opens the circuit to relay 14DR and relay 13BB. Relay 14DR restores. Relay 14CR operates, closes ground to lead 14INT ST & ALM to start the functions of the alarm interrupter circuit, if that circuit is not functioning at this time, closes a multiple ground to lead 10C1 and relays 12KE and 12KF, and closes −110V through relay 14CP to leads −10L and +10L. Relay 14CP operates (if there is a coin in the chute), lights the coin alarm lamp and closes a circuit at contacts 14CP1 to relay 14CS. Relay 14CS operates, closes lead 14PU to relay 13CA, and closes a multiple circuit to relay 14CR.

Relay 13BB restores, opens the circuit to coil B of relay 15DA, opens lead 14BL, opens the circuits to relays 13CC, 14CD, 14JC, the operated rate relays (10WR–10ZR, and 11LS, 11LX, 11HS, 11HX). The above relays restore. When relay 14CD restores, the circuit is opened to relay 12AL. Relay 12AL restores and opens lead 12 busy tone from lead −10L. When the chute clears, the circuit is opened to relay 14CP. Relay 14CP restores and opens the circuit to relay 14CS. Relay 14CS restores, opens the circuit to relay 14CR, opens lead 14PU from relay 13CA and extinguishes the coin alarm lamp. Relay 14CR restores, opens the circuits to relays 12KE and 12KF, and removes ground from 10C1 to mark this circuit idle and release the preceding equipment. Relay 12KF restores. Relay 12KE restores and extinguishes the busy lamp 13BL: This circuit is now at normal.

If the chute does not clear immediately, relay 14CP remains operated and when ground is closed to lead 14PU, the circuit is closed to relay 13CA. Relay 13CA operates, locks, and closes lead 13 INT GRD to relay 16TP and the number two winding of relay 14CS. When ground appears on lead 13 INT GRD the circuit is closed to the number two winding of relay 14CS and relay 16TP. Relay 16TP operates and removes the −110V from relay 14CP and the line lead. Relay 14CP restores and opens the number one winding of relay 14CS. Relay 14CS remains operated on its number two winding. When ground is removed from 13 INT GRD relay 16TP restores and recloses the −110V to relay 14CP and the line lead. Relay 16TP will continue following the pulses over lead 13 INT GRD and in turn pulse the −110V over the line lead until the chute clears. When the chute clears, the circuit restores to normal, as described above, and in addition, when relay 14CR restores, the circuit is opened to relay 13CA, which restores.

If the initial fee has not been deposited by the time a busy condition is encountered, relay 14CR will initially operate and function as described above, but since there are no coins in the chute, relay 14CP, and in turn relays 14CS, 13CA and 16TP, will not operate. When relay 14JC restores, the circuit is opened to relay 14CR. Relay 14CR restores and functions as described above.

END OF SENDING (OPERATED: RELAYS 13BS, 13BB, 13BF, 12KE, 12KF, 13CC, 14CD, 14JC, 15SB, 14DR, ONE OR TWO OF THE 10WR–10ZR RELAYS, AND ONE OF THE 11HX, 11HS, 11LX, AND 11LS RELAYS)

When all digits have been pulsed out by the sender, the sender closes ground to lead 16SS. Relay 15SC operates, locks, closes the calling line loop to the outgoing line leads, closes coil A of relay 15DA across the outgoing loop, opens the circuit of relay 15SB, and opens lead 10EC from coil A of relay 15DA.

Relay 15SB restores and opens leads 16SR, 16ST, 16SH, 16SG, 16SF, and 16SS to release the sender. The succeeding equipment should now complete the connection to the called line. If the called party does not answer, and the calling party disconnects, the coins are refunded and the circuit releases as described in the preceding section. In addition, relay 15SC will release when relay 13BB releases and opens the circuit to relay 15SC.

CALLED PARTY ANSWERS (OPERATED: RELAYS 13BA, 13BB, 13BF, 12KE, 12KF, 13CC, 14CD, 14JC, 14DR, 15SC, ONE OF THE 10WR–10ZR RELAYS AND ONE OF THE 11LS, 11LX, 11HS, 11HX RELAYS)

When the called party answers, the polarity is reversed to coil A of relay 15DA. Relay 15DA, having current in both windings in the same direction, operates, closes lead 12IPM to relay 16TP and transfers the circuit of the busy lamp 13BL from 60 IPM ground through resistor 15R2, to steady ground through resistor 15R1. The busy lamp now lights dimly and steadily. The conversation may now take place.

TIMING (OPERATED: RELAYS—SAME AS IN PRECEDING SECTION PLUS 15DA)

When a ground pulse appears on lead 12IPM, relay 16TP operates and completes a circuit to magnet 16PC. Magnet 16PC operates and opens its INT1 and INT2 springs. When ground is removed from lead 12IPM, relay 16TP restores and opens the circuit to magnet 16PC. Magnet 16PC restores, steps to the first bank contact and operates its off-normal springs. On the second ground pulse on lead 12IPM, relay 16TP reoperates, recloses the circuit to magnet 16PC. When ground is removed from lead 12IPM at the end of the second pulse, relay 16TP restores, opens the circuit to magnet 16PC. Magnet 16PC restores and steps to the next bank contact. Relay 16TP follows the pulses on lead 12IPM and in turn pulses magnet 16PC, which steps the switch at the rate of 12 steps per minute. When the level A wiper rests on the third bank contact, the circuit is closed to relay 15TA. Relay 15TA operates, locks, and prepares the circuit to relay 15OT. After one complete revolution (33 steps), the switch returns to its original position and continues stepping until its fourth bank contact is reached. On the 37th step (and three minutes after the timing started), the circuit is closed through the wiper of level A, switch 16PC, to relay 15OT. Relay 15OT operates, locks through its "X" contacts 15OT8, opens lead 12IPM from relay 16TP, closes a circuit to relay 11KC, transfers the busy lamp from steady ground through resistor 15R1 to 120IPM ground through resistor 15R1, and closes the circuit to magnet 16PC in series with relay 13BE. Relay 11KC operates, closes ground to lead 10STB to start the function of the overtime trunk allotter. Magnet 16PC operates, opens its own circuit, restores, steps to the next bank contact, closes its own circuit, reoperates, and continues stepping in the same manner until its homing position is reached. Relay 13BE operates in series with magnet 16PC, closes 120IPM to the busy lamp and lead 14BL, closes ground to lead 13 RLS ALM and transfers ground to lead 10C1. Relay 13BE is slow-to-release and remains operated during the stepping of magnet 16PC. When switch 16PC steps to normal, the off-normal springs operate, open the circuit to relay 13BE, open further the circuit to magnet 16PC to prevent switch 16PC from reoperating when its interrupter springs INT1 and INT2 restore, and close the circuit to relay 15TB. Relay 15TB operates, locks, and prepares the circuit to relay 15TM.

SWITCH-THROUGH TO OVERTIME TRUNK (OPERATED RELAYS: SAME AS IN THE PRECEDING SECTION PLUS 15TA and 15OT)

Ground on lead 10STB starts the functions of the overtime trunk allotter, which searches for an idle overtime trunk. When the overtime trunk is found and seized, the overtime trunk signals the operator and starts the functions of the collector hunter which searches for the calling collector. Ground through relay 12KD on lead 10HB provides a stopping circuit for the collector hunter. When the collector hunter finds and seizes this collector, battery on lead 10HB from the overtime trunk closes the circuit to relay 12KD. Relay 12KD operates, connects the overtime trunk to the line leads, opens relay 11KC, closes lead 10PB, through the wiper of level B, switch 10TR, to magnet 10TR, closes the circuit to relay 16RR to the sixth bank contact of switch 10TR, level B, opens the circuit to relay 13BF, and closes a multiple circuit to relay 13BA. Relay 13BF restores. Relay 11KC restores and removes ground from lead 10STB. When lead 10PB is closed to magnet 10TR, the overtime trunk closes six ground pulses to magnet 10TR. Magnet 10TR functions and markings will be extended to the overtime trunk in the same manner as to the initial fee trunk described in an earlier section.

When the operator answers, the transmission circuit is established from the operator's position circuit, through the overtime trunk, over leads 10RB and 10TB, to the calling and the called line leads, and ground is closed over lead 10PB to relay 16TS. Relay 16TS operates its "X" contacts 16TS3. The operator states the overtime condition and operates her coin collect key which places +110V to the calling line to collect the coins at the paystation. When the coins are collected, the operator operates her "Talk and Hold" key to the "Hold" position and may leave the connection, but the switch-train will remain locked in to the battery feed relay in the overtime trunk.

OVERTIME TIMING (OPERATED RELAYS: 13BA, 13BB, 13BF, 12KE, 12KF, 13CC, 14CD, 14JC, 14DR, 15SC, ONE OF THE 11LS, 11LX, 11HS, 11HX RELAYS, 16TS "X" CONTACTS ONLY AND 15TB)

When the key is operated to the "Hold" position, ground is removed from lead 10PB. Relay 16TS operates fully, transfers the busy lamp 13BL from a 120IPM ground to a steady ground through resistor 15R1, opens lead 10PB from its number two winding, and closes lead 12IPM to relay 16TP. Relay 16TP follows the pulses on lead 12IPM and causes switch 16PC to step in the same manner as described in an earlier section. When, on the 12th step, the level B wiper is stepped to the first bank contact and the circuit is closed to relay 15TM, relay 15TM operates, closes ground to lead 10PB to mark one minute intervals, and closes the circuit to magnet 16PC and relay 13BE in series. Magnet 16PC homes, and relay 13BE functions, as described in the preceding section. In addition, when relay 13BE restores, the circuit is opened to relay 15TM, which restores.

Relay 16TP and switch 16PC will continue functioning as described above. Each time the level B wiper of switch 16PC steps to the first bank contact (which occurs once each minute), relay 15TM operates and sends the ground marking over lead 10PB to the overtime trunk. The cycling will continue until one of the parties disconnects. At the 99 minute mark, an alarm is provided to indicate to the operator that 99 minutes of overtime have elapsed. The operator may operate her "Talk" key and talk to both parties. The next minute mark will cause the overtime trunk to provide a 01 minute reading.

*Release*

RELEASE BEFORE 3 MINUTE MARK (OPERATED: RELAYS 13BA, 13BB, 13BF, 13CC, 14CD, 14JC, 15SC, 12KE, 12KF, 15DA, 14DR, ONE OF THE 10WR–10ZR RELAYS, ONE OF THE 11LS, 11LX, 11HS, 11HX RELAYS, AND POSSIBLY 16TP)

When the calling party disconnects first, the line loop is opened to relay 13BF. Relay 13BF restores and opens the circuit of relay 13BA. Relay 13BA restores, opens the circuit to coil A of relay 15DA, opens the circuit to 14DR, opens the circuit to 13BB, closes ground to lead 10C2, and removes ground from leads 10HA and 10HB. Relay 14DR restores. Relay 15DA restores, opens lead 12IPM from relay 16TP, and closes lead 60IPM to the busy lamp 13BL. Relay 16TP, if operated, restores. Relay 13BB restores, opens the circuits to relays 13CC, 14CD, 14JC, 15SC, 12KE, 12KF, and the operated rate relays (10WR—10WZ and 11LX, 11LS, 11HX, 11HS), and closes the circuit of relay 13BE in series with magnet 16PC. Relays 13CC, 14CD, 14JC, 15SC, 12KE, 12KF and the operated rate relays restore. Relay 13BE operates in series with the magnet, closes lead 120IPM to the busy lamp 13BL, which flashes brightly at a rate of 120 interruptions per minute, grounds lead 13RLS ALM, and transfers ground on lead 10C1. Magnet 16PC operates, opens its own circuit and the circuit to relay 13BE, restores, steps to the next bank contact, closes its own circuit and the circuit to relay 13BE, reoperates and continues stepping in the same manner until its normal position is reached. Relay 13BE is slow to release and remains operated during the stepping of switch 16PC. When the normal position is reached, the off-normal springs of switch 16PC operate and open the circuit to magnet 16PC and relay 13BE. Relay 13BE restores and removes ground from lead 10C1 to release the preceding equipment and mark this circuit idle. This circuit is now at normal. The coin collect voltage is provided by the paystation repeater.

When the calling party disconnects first, the line loop is opened to coil A of relay 15DA. Relay 15DA restores, transfers the busy lamp 13BL and lead 14BL from a steady ground through resistor 15R2 to 60IPM ground through resistor 15R2, and opens lead 12IPM from relay 16TP. Relay 16TP, if operated, restores. The lamp flashes at a rate of 60IPM. When the calling party releases, the circuit restores to normal, as described above.

RELEASE FROM OVERTIME CONDITION (OPERATED: RELAYS 13BA, 13BB, 13CC, 14CD, 12KD, 12KE, 12KF, 14JC, 15SC, 15DA, 14DR, 15OT, 15TA, 15TB, 16TS, ONE OR TWO OF THE 10WR-10ZR RELAYS, ONE OF THE 11LS, 11LX, 11HS, 11HX RELAYS AND POSSIBLY 16TP OR 15TM)

When the calling party disconnects first, the line loop is opened to the battery feed relay in the overtime trunk. The relay restores, signals the operator that the calling party has disconnected, and closes ground to lead 10FB. Relay 16RR operates, locks and opens leads —10T and +10T to release the succeeding equipment. The operator operates her "Ring" key which closes the ringing current to the calling paystation. When the calling party re-enters the connection, the operator instructs the calling party to deposit the overtime charges, monitors while the party is depositing coins, and after the coins have been deposited, closes +110V to the line leads to collect the coins. (The paystation repeater will collect coins automatically upon calling party release, should the operator forget to collect the coins.)

When the calling party and the operator disconnect, the overtime fee trunk restores and removes battery from lead 10HB. Relay 12KD restores and opens the circuit to relay 13BA. Relay 13BA restores and further release is the same as described in the preceding section. In addition, relays 15OT, 15TA, 15TB, and 16RR are locked to ground at the springs of operated relay 13BB and all restore when relay 13BB restores. When relay 15OT restores, the circuit is closed to magnet 10TR which steps self-interrupted to normal. Should relay 15TM be operated, it restores when its circuit is opened by the release of relay 13BE.

SEIZURE OF SENDER (OPERATED: RELAY 17FB)

This circuit is marked idle to a preceding calling collector circuit by absence of ground on lead 16SG. When this circuit is seized ground is closed to lead 16SG and relay 17SH via lead 16SH. Relay 17SH operates, closes the line termination, grounds lead 16SG to mark this circuit busy, closes the circuit to the motor magnet of switch 20OS, and closes ground to lead 17ML and the busy lamp 17BL. The busy lamp 17BL lights brightly to indicate this this circuit has been seized. Switch 20OS operates and opens its operating path via its springs INT1, INT2. Swith 20OS restores and advances its wipers to the first bank contact and operates its off-normal springs.

DIGIT STORAGE (OPERATED: RELAYS 17FB AND 17SH AND SWITCH 20OS)

Figure 21:
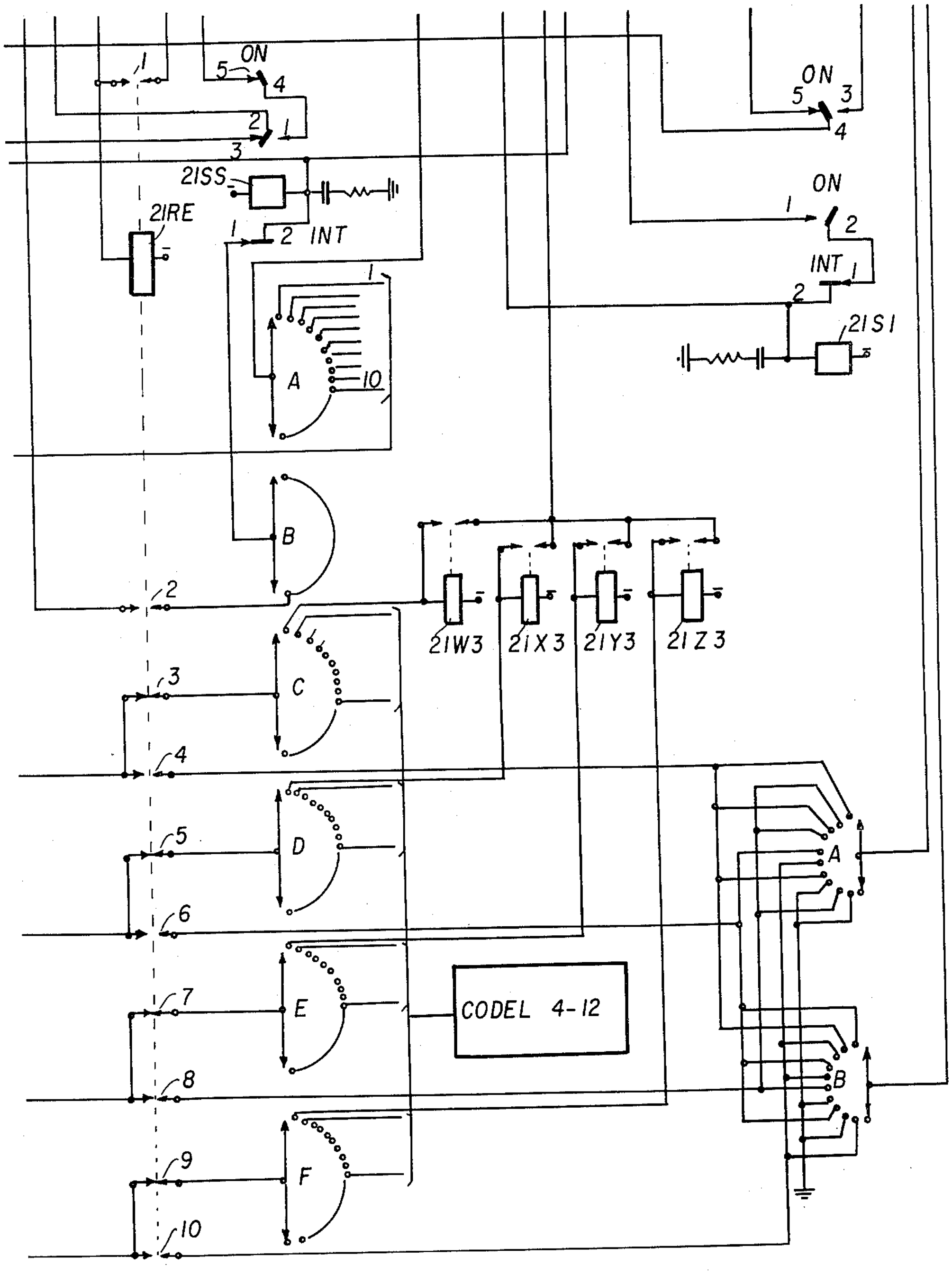

When the register-sender has sent the second digit, a resistance ground is placed on lead 16SF by the collector. Relay 18RA operates from this ground (relay 18RF does not operate) and closes a circuit to relay 18RB. Relay 18RB operates, prepares a locking ground for the codel storage relays of FIG. 21, and closes a circuit to the motor magnet of switch 21SS. Switch 21SS operates and opens its own operating path via its interrupter springs INT1, INT2. Switch 21SS restores and advances its wipers one step.

Relay 18RA now follows the pulses of the third digit. On the first pulse relay 18RA restores, opens the circuit to relay 18RB, and closes the circuit to relays 20RC and 20S. Relay 20RC operates the closes a circuit to relay 20RD. Relay 20S operates and prepares the circuit to relay 20T. Relay 20RD operates, closes the circuits to switches 20OS and 21SS and short-circuits the number two winding of relay 20T for the duration of the pulse. Switches 20OS and 21SS operate but do not advance their wipers at this time since they are indirect drive switches.

At the end of the first digit, relay 18RA reoperates, closes the circuit to relay 18RD, opens the circuit to relays 20RC and 20S and removes the short-circuit from the number two winding of relay 20T. Relays 18RB and 20RC are slow to release and remain operated during pulsing. Relay 20T now operates in series with relay 20S and transfers the pulsing circuit of relay 18RA to magnet 20DS. On the next pulse relay 18RA reoperates and closes the circuit of magnet 20DS via the number one winding of relay 20T. Switch 20DS operates and opens its interrupter springs INT1 and INT2, which opens the circuit to relay 20S and the number two winding of relay 20T. Relay 20S restores. Relay 20T remains operated on its number one winding for the duration of the pulse. At the end of the second pulse, relay 18RA restores and opens the circuit to the number one winding of relay 20T and magnet 20DS. Relay 20T restores and transfers the pulsing circuit to relay 20S. Switch 20DS restores and advances its wipers one step.

This same sequence of operations for relays 20S and 20T and switch 20DS is repeated for the remaining pulses (if any) and switch 20DS will advance its wipers following the second, fourth, sixth, eighth, and tenth pulse.

At the end of the digit, relay 18RA reoperates, closes a circuit to relay 18RB, and opens the circuit to relay 20RC. After its slow-to-release interval, relay 20RC restores and opens the circuit to relay 20RD. Relay 20RD is slow to release and does not restore immediately. During the interval of time when relay 20RC is restored and relay 20RD remains operated, ground is closed via the various level C, D, E and F wipers of switches 20DS and 21SS to the codel storage relays in codel group 3.

The different combinations of codel relays which operate will depend on the digit dialled. If the digit is odd, relay 20T is operated and ground is closed over the level D and F wipers of switch 20DS. If the digit is even, relay 20T is restored and ground is closed over the level C and E wipers of switch 20DS. The codel relay combinations and their decimal equivalents are as follows:

| Codel Relays Operated | Decimal Equivalent | Codel Relays Operated | Decimal Equivalent |
|---|---|---|---|
| WX | 1 | YZ | 6 |
| WY | 2 | W | 7 |
| WZ | 3 | X | 8 |
| XY | 4 | Y | 9 |
| XZ | 5 | Z | 0 |

The various W, X, Y, Z codel relays in codel group 3 operate and lock. After its slow-to-release interval, relay 20RD restores, closes the "homing" circuit to switch 20DS, opens the circuits of switches 20OS and 21SS, and opens the circuits of relays 20S and 20T which, if operated, restore. Switch 21SS restores and advances its wipers to bank contact number two. Switch 20OS also restores and advances its wipers to bank contact number two. Switch 20DS "homes" to bank contact one or six.

All succeeding digits are recorded in a similar manner and are stored in codel groups 4–12.

SENDING (OPERATED: RELAYS 17FB, 17SH, 18RA, 18RB, 20RD, THE STORAGE RELAYS OF THE CODEL GROUPS 3–12, AND SWITCHES 20OS, 21SS)

When the register-sender releases, the collector circuit places a direct ground on lead 16SF. Relay 17SF now operates in series with relay 18RA and closes a circuit to relay 21RE. Relay 21RE operates, locks, short-ircuits relay 17SD, closes motor magnet 21SS to ground through level A of switch 21SS, and closes levels C, D, E, and F of switch 21SS to levels A and B of switch 21S1. Switch 21SS steps self-interrupted to its first bank contact.

SENDING TO A STEP-BY-STEP OFFICE (OPERATED: RELAYS 17FB, 17SH, 18RA, 18RB, 20RD, ONE OR TWO OF THE STORAGE RELAYS OF EACH OF THE CODEL GROUPS 3–12 AND SWITCH 20OS)

When the collector switches through to an initial fee trunk and the call is to a step-by-step office, direct ground on lead 16SF is replaced by resistance ground. Relay 18RF restores on this resistance ground and removes the short circuit from relay 17SD. Relay 17SD operates in series with relay 21RE, closes a circuit relay 18ST, and opens the "homing" circuit of switch 21SS. Relay 18ST operates, prepares a circuit to relay 19PE and closes ground to the pulse generator 18GE. The pulse generator 18GE operates and closes intermittent ground pulses to relay 19PR at the rate of ten pulses per second. Relay 19PR operates on the first ground pulse and closes a circuit to relay 19PE. Relay 19PE operates, short-circuits relay 19PR for the duration of the pulse, and closes a circuit to motor magnet 21SS. Switch 21SS operates. At the end of the first pulse, relay 19PR restores and removes the short-circuit from relay 19PF. Relay 19PF operates, prepares the line loop for pulsing and transfers the pulsing circuit of relay 19PR to switch 21S1. Relay 19PR continues to follow the interrupted ground pulses and repeats them to switch 21S1 and the succeeding equipment via leads 16SR and 16ST. Switch 21S1 operates and restores with each pulse and advances its wipers once every pulse. On the first pulse, switch 21S1, off-normal springs ON3 and ON4 operate and close the circuit to relay 19PG. Relay 19PG operates and locks. Switch 21S1 continues to follow the pulses and steps its wipers to the level corresponding to the digit stored on codel relay group 3. At this level a circuit is closed from levels A and B of switch 21S1 to the two windings of relay 19PC. Relay 19PC operates with both windings in series, closes the circuit of the number one winding of relay 18PB, and closes the line loop to prevent further outpulsing. Relay 18PB operates, prepares a locking circuit, and transfers the pulsing circuit from switch 21S1 to 17S2.

Switch 17S2 now steps at the rate of ten pulses per second under the control of relay 19PR. On the first step, switch 17S2 operates its off-normal springs ON3 and ON4 which closes a circuit to the number two winding of relay 18PB and motor magnet 21S1 via the off-normal springs ON1 and ON2 and the interrupter springs INT1 and INT2. Switch 21S1 steps self-interrupted to its home or normal position where its off-normal springs restore and open the circuit to the motor magnet. Switch 21S1, in stepping, opens the circuit to relay 19PC. Relay 19PC restores.

When switch 17S2 engages its fourth bank contact, the circuit to relays 19PE and 19PF is opened. Relay 19PF restores. Relay 19PE restores, opens the circuit to the number one winding of relay 18PB, opens the circuit to switch 21SS, and closes a circuit to switch 17S2 through its off-normal springs ON1 and ON2 and interrupter springs INT1 and INT2. Switch 21SS restores and advances its wipers one step to send the next digit. Switch 17S2 steps self-interrupted to its normal position where its interrupter and off-normal springs restore to open the circuit to the number two winding of relay 18PB. Switch 17S2 is provided to furnish an interdigital pause for the succeeding equipment. Relay 18PB restores, opens part of the line loop, and prepares the pulsing circuit to switch 21S1.

This circuit is now ready to send out the next digit which is outpulsed in the same manner as the first. On calls to a step-by-step office, two of the stored digits are not sent out until the initial fee has been deposited and the operator has disconnected. All other digits (two less than the total number) are now sent out.

When these digits have been pulsed out, a circuit is closed from ground at the off-normal springs ON5 and ON6 of switch 17S2 via levels B and A of switch 20OS, level A of switch 21SS, contacts 19PE5, 18RF3 to relay 17SE. Relay 17SE operates, locks, opens the circuit to relay 18ST, and removes ground from the pulse generator 18GE to stop pulsing. Relay 18ST restores.

When the initial fee has been deposited and the operator has released, the collector again places direct ground on lead 16SF. Relay 18RF operates in series with relay 18RA and opens the circuit to relay 17SE. Relay 17SE restores and closes the circuit to relay 18ST. Relay 18ST operates, prepares a circuit to relay 19PE, and closes ground to the pulse generator 18GE. The pulse generator 18GE again closes intermittent ground pulses to relay 19PR at the rate of ten pulses per second. Switch 21S1 now pulses out the last two digits that switch 21SS has stored to complete the connection.

When the last digit has been sent, switch 21SS steps to the bank contact corresponding to the bank contact on which switch 20OS is engaged to close a circuit to relay 17SC as an indication that sending is completed and release can now take place.

SENDING TO A CROSSBAR OFFICE (OPERATED: RELAYS 17FB, 17SH, 18RA, 18RB, 20RD, THE STORAGE RELAYS OF THE CODEL GROUPS 3–12, AND SWITCHES 20OS, 21SS)

If the call is to a crossbar office, direct ground is momentarily replaced by resistance ground on lead 16SF when the collector circuit has switched through to an initial fee trunk and the operator has disconnected. Relay 18RF operates and removes the short-circuit from relay 17SD. Relay 17SD operates in series with relay 21RE and closes a circuit to relay 18ST. Relay 18ST operates and initiates the operation of the pulse generator 18GE. When direct ground is placed on lead 16SF, relay 18RF reoperates and opens an incomplete circuit to relay 17SE. All digits are now pulsed out as described in the preceding section with the following exception: the last two digits will not be held back since relay 17SE does not operate.

RELEASE (OPERATED: RELAYS 18RA, 18RB, 21RE, 17SD, 17SH, 18RF, 18ST, AND 17FB AND SWITCHES 20OS AND 21SS)

When switch 21S1 has sent out the last digit, switch 21SS steps and a circuit is closed through level A of switch 20OS and level B of switch 21SS to relay 17SC. Relay 17SC operates, locks, opens the circuit to relays 18RB, 21RE, and 17SD, grounds lead 16SS, and closes lead 120IPM to the busy lamp 17BL. The busy lamp 17BL flashes at 120IPM to indicate that release is taking place. Ground on lead 16SS indicates to the collector that sending is completed and release of the circuit can now take place. The collector releases this circuit by opening leads 16SF and 16SH. Removal of ground from leads 16SH and 16SF opens the circuits of relays 18RA, 17SH, and 18RF. Relay 17SD restores, opens the circuit of relay 18ST, and the pulse generator 18GE. Relay 17SH restores and closes the line termination. Relays 18RF, 18RA, 18ST, and 21RE restore. After its slow-to-release interval, relay 18RB restores, removes the holding ground from the operated codel storage relays, opens the circuit to the number two winding of relay 17SC, and closes 17SC and switch 21SS through the interrupter and off-normal springs of switch 21SS. Switch 21SS steps self-interrupted to its normal position where its off-normal springs restore and transfer the number one winding of relay 17SC to switch 20OS. Switch 20OS steps self-interrupted to its normal position where its off-normal springs restore and open the circuit to the number one winding of relay 17SC and switch 20OS. Relay 17SC restores, removes lead 120IPM from the busy lamp 17BL and lead 17ML, and removes ground from leads 16SS and 16SG to mark this circuit idle. This circuit is now at normal and ready to receive another call.

*Stop-send condition*

When a stop-send condition is encountered, ground is forwarded on lead 16SS to relay 19PH. Relay 19PH operates, closes ground to relay 17TO via thermistor 17TH and resistor 17R4, and prepares a holding circuit for relay 19PE through bank contact four, level A of switch 17S2. The thermistor 17TH starts to heat up and decrease its resistance thus increasing the current to relay 17TO. After approximately five seconds the resistance has decreased enough to allow relay 17TO to operate its "X" contacts.

Switch 17S2, while providing an interdigital pause, will not open the circuit to relay 17PE at bank contact number four and relay 17PE remains operated causing switch 17S2 to step at 10 pulses per second. When switch 17S2 engages bank contact ten a circuit is closed to relay 18PK. Relay 18PK operates its "X" contacts, locks on its number two winding, operates completely and prepares a circuit to relay 18PL. When switch 17S2 engages bank contact number nine, after having stepped around again, a circuit is closed to the number one winding of relay 18PL. Relay 18PL operates its "X" contacts, locks on its number two winding, operates completely, and opens the circuit of bank contact number four, level A of switch 17S2. When switch 17S2 engages bank contact number four on its third rotation, the circuit to relays 19PE and 19PF is opened. Relay 19PE restores, opens the circuit of switch 21SS, and closes the "homing" circuit of switch 17S2.

The stepping of switch 17S2, under a stop-send (stop-dial) condition, allows the interdigital pause to be extended to 2.2 seconds to permit the sender to distinguish between a stop-send condition and a busy condition. If the stop-send condition is present for less than 5 seconds sending will proceed when ground is removed from lead 16SS. Relay 19PH now restores and opens the circuit of relay 18PB. Relay 18PB restores and prepares the pulsing circuit as previously explained.

However, if the stop-dial condition should remain for 5 seconds, the resistance of the thermistor will have decreased sufficiently to allow relay 17TO to operate its "X" contacts. Relay 17TO now operates completely, opens the circuits to relay 17SH, 17SD, 17RE, 19PE, and 19PF, and closes lead 120IPM to the busy lamp 17BL and lead 17M. The busy lamp 17BL flashes brightly at 120IPM to indicate that release will now take place. Release of this circuit now takes place, as previously described, relay 17TO restoring when relay 18RB restores.

*Busy condition*

If a busy condition is encountered an interrupted ground is placed on lead 16SS. On the first ground pulse relay 19PH operates, shunts relay 19PJ, and closes a circuit to relay 17TO via the thermistor 17TH and resistor 17R4. When ground is removed from lead 16SS, the shunt is removed from relay 19PJ. Relay 19PJ operates and transfers lead 16SS from relay 19PH to 17FB. On the next ground pulse the number one winding of relay 17FB is short-circuited. Relay 17FB restores, grounds lead 16SG and opens lead 16SH to release this circuit as previously described.

When this circuit returns to normal the short-circuit is removed from the number one winding of relay 17FB. Relay 17FB operates and opens lead 16SG to mark this circuit idle.

*Sender overrun*

If switch 21S1 does not encounter any marking on its bank contact, relay 19PC will not operate and therefore, relay 18PB will not operate. When switch 21S1 steps to its normal position, its off-normal springs restore and close a circuit to the number one winding of relay 17TO. Relay 17TO operates, locks, closes lead 120IPM to the busy lamp 17BL and lead 17ML, and closes a locking circuit for relay 17SH. This circuit will remain operated by mutually locked relays 17SH and 17TO. The busy lamp 17BL flashes brightly at 120IPM to indicate that an overrun condition has occurred and that this circuit must be manually released. When the busy key 17BK is operated, relays 17TO and 17SH restore to return this circuit to normal.

USING AN INITIAL FEE TRUNK

*Seizure by an allotter*

When a collector requires an initial fee trunk ground is placed on lead 10STA. Relay 1ST operates and closes the circuit to the motor magnet of switch 1MA, to relay 1ST1 and the bank contacts of level A via its INT springs. Switch 1MA steps self-interrupted to the first bank contact. If that trunk is busy, direct ground is closed to switch 1MA and relay 1ST1. Switch 1MA reoperates and steps self-interrupted to the next bank contact. This self-interrupted stepping continues until an idle trunk marked by a high resistance ground is found. When an idle trunk is encountered, relay 1ST1 operates and locks in series with magnet 1MA (switch 1MA does not operate because of the high resistance).

When the initial fee trunk is seized, resistance ground is closed to the collector finder via lead 2MA and lead 10GA is closed to lead 2MA. An idle collector is marked by ground on lead 10GA while a collector requiring service is marked by absence-of-ground on lead 10GA. When an idle collector is encountered by switch 1CFB, ground is closed to lead 10GA. Ground on lead 10GA short-circuits a relay in the initial fee trunk and operates switch 1CFB. Switch 1CFB steps self-interrupted to the next bank contact. Switch 1CFB continues to hunt until the calling collector is encountered. Absence-of-ground on lead 10GA causes a relay in the initial fee trunk to operate in series with switch 1CFB, switch 1CFB does not operate because of the high resistance ground. This causes the collector finder to stop on the collector requiring service and closes lead 10GA to ground to mark the switch busy.

*Seizure of initial fee trunk*

Upon release of the register sender, the collector circuit of FIGS. 10 to 16 signals the initial fee trunk allotter, FIG. 1, for an idle initial fee trunk. Absence of low resistance ground on lead 2A marks this trunk idle. When seized, battery on lead 2A closes a circuit to relay 2BA. Relay 2BA operates, closes ground through the number one winding of relay 2BB to lead 2MA to the motor magnet of the collector hunter circuit and closes lead 2MA to lead 10GA which causes the collector hunter to search for the calling collector. When the calling collector is found, absence-of-ground on lead 10GA allows relay 2BB to operate from battery on lead 2MA. Relay 2BB operates its "X" contacts 2BB5 first, locks on its number two winding to ground potential on lead 10HA, closes leads 10TA and 10RA to battery through the number one winding of relay 2BF and ground through the number two winding of relay 2BF, respectively, to provide the transmission battery to the calling paystation and to prepare the paystation repeater for coin control functions, closes ground to lead 10GA to prevent another collector hunter from seizing the same collector, closes ground to lead 2A to short relay 2BA, mark this trunk busy and step off the initial fee trunk allotter and thus permit the initial fee trunk allotter to be used on other calls, removes ground from lead 2TBA for a possible all initial fee trunk busy condition, closes ground to light lamp supervisory 3LA. Relay 2BA restores and opens the circuit to the number one winding of relay 2BB. Relay 2BF operates on the paystation loop and closes the circuit to relay 3BFS. Relay 3BFS operates, closes ground to lead 4CP to light the call pilot lamp at the operator's position, closes ground to lead 4CW to light the call waiting lamp, closes ground to lead 3MC, transfers ground from lead 3GC to lead 3HC to mark this trunk to the initial fee trunk hunter as the trunk requiring operator's services, and closes leads 3PC and 3FC to leads 10PA and 10FA. (Six ground pulses will be extended over lead 3PC from the operator's control circuit to the collector, and rate marking pulses will be returned from the collector over lead 10FA to the operator's control circuit with no further effect on the functions of this trunk.)

AUTOMATIC REFUND OF THE INITIAL COIN DEPOSIT (OPERATED: RELAYS 2BB, 2BF AND 3BFS)

The lighted call pilot lamp indicates to the operator that an initial fee trunk is calling for service. The operator operates the "Accept" key momentarily which causes the initial fee trunk hunter to search for the calling initial fee trunk.

Absence-of-ground on lead 3GC causes the initial fee trunk hunter to seize this trunk. When the initial fee trunk hunter seizes this trunk, ground on lead 3AC closes a circuit to relay 3TA. Relay 3TA operates, locks, opens leads 4CP and 4CW to extinguish the respectively associated lamps, removes direct ground from the supervisory lamp 3LA, which now lights dimly from ground through resistor 2R2, closes ground through resistor 2R1 to lead 3LC to light the "guard" lamp at the operator's position, closes ground to lead 3GC to prevent another initial fee trunk hunter from seizing this trunk, reverses the polarity over leads 10TA and 10RA, closes relay 2CC in series with relay 3FR to lead 3KC, and closes the circuit to relay 2CRB.

Relay 2CRB operates and closes a circuit to relay 2CCA. Relay 2CCA operates, closes a circuit to relay 2CRA, closes —110V to leads 10TA and 10RA to refund the coin(s) at the paystation (deposited to access the line equipment), and opens the circuit to relay 2BF. Relay 2BF restores and closes 120IPM ground over lead 3LC to lamp "guard" at the operator's position. Lamp "guard" flashes brightly. Relay 2CRA operates, locks, and opens the circuit to relay 2CRB. Relay 2CRB restores, removes —110V from leads 10TA and 10RA and opens the circuit to relay 2CCA. Relay 2CCA restores and recloses the transmission loop. Relay 2BF reoperates and transfers lead 3LC from lead 120IPM to ground through resistor 2R1. Lamp "guard" at the operator's position now glows steadily and dimly.

OPERATOR REPEATS COIN REFUND (OPERATED: RELAYS 2BB, 2BF, 3BFS, 3TA AND 2CRA)

Whether the coin(s) has been refunded by the an automatic —110V pulse may be verified by conversation between the operator and the calling party. If the coin(s) has not been refunded, the operator may repeat the coin refund by operation of the coin refund key which closes the circuit to relay 3SL and closes —110V to lead 3TC. Relay 3SL operates, opens the operator's side of the repeat coil 3RC, and closes —110V on lead 3TC to relay 2CC. Relay 2CC operates and closes a circuit to relay 2CCA. Relay 2CCA operates, extends —110V on lead 3TC over lead 10TA and 10RA to the calling paystation, and opens the calling party side of the repeat coil, thus opening the circuit of relay 2BF. Relay 2BF restores and functions as in the preceding section.

When the operator releases the coin refund key, the circuit is opened to relay 3SL, and —110V is removed from lead 3TC. Relay 3SL restores and recloses the operator's side of the transmission loop. Relay 2CC restores, removes —110V from leads 10TA and 10RA, and opens the circuit of relay 2CCA. Relay 2CCA restores and completes the transmission loop. Relay 2BF reoperates and functions as previously described.

The operator instructs the calling party to deposit the fee for the first three minutes and monitors while the coins are being deposited. When the coins have been deposited, all initial fee equipment may be released.

*Release*

OPERATOR RELEASES UPON DEPOSIT OF BASE CHARGE (OPERATED: RELAYS 2BF, 2BB, 3BFS, 3TA AND 2CRB)

To release the initial fee equipment, the operator operates the release key at her position which closes ground to lead 3SC. Relay 3TS operates, locks, opens the circuit to the number two winding of relay 2BB, opens the circuit to relay 3BFS, closes direct ground to lead 3LC, and closes lead 120IPM to the supervisory lamp 3LA. Supervisory lamp 3LA flashes brightly. Relay 2BB restores, opens the circuit of relay 2BF, removes ground from lead 10GA, and closes ground to lead 2TBA. Relay 2BF restores. Relay 3BFS restores, opens the circuit of relay 3TA, removes ground from lead 3MC, transfers ground from lead 3HC to lead 3GC, opens leads 3FC and 3PC from lead 10FA and 10PA, respectively, and opens the circuit of relay 3TS. Relay 3TS restores and removes ground from leads 3LC and 2A. This circuit is now at normal.

FORCED RELEASE (OPERATED: RELAYS 2BB AND 2BF)

If the operator cannot accept the call, she operates the "accept" and the "coin-refund" keys simultaneously. This closes ground to leads 3KC and 2A, closes the circuit to relay 3SL and closes —110V to lead 3TC. Relay 3SL operates and closes —110V via lead 3TC to relay 3FR. Relay 3TA operates, closes —110V to relay 2CC and functions as described in penultimate preceding section. Relay 3FR operates, closes ground to lead 10PA and closes a circuit to relay 3TS. Relay 3TS functions as in the preceding section. Absence of battery on lead 10HA causes the collector to open leads 10TA and 10RA, and ground on lead 10PA causes the collector to extend busy tone to the calling line. Relay 2CC operates and closes a circuit to relay 2CCA. Relay 2CRB operates. Relay 2CCA operates, closes a circuit to relay 2CRA and closes —110V to leads 10TA and 10RA (this is of no significance since leads 10TA and 10RA are open in the collector). Relay 2CRA restores. Relays 2BB, 2BF, 3BFS, and 3TA restore in the same manner as described previously.

When the operator releases the "accept" and the "coin-refund" keys, the circuits are opened to relays 3SL, 2CC, and 3TA. Relays 3SL and 3TA restore. Relay 3FR restores and opens the circuit to relay 3TS. Relay 2CC restores and opens the circuit to relay 2CCA. Relay 2CCA restores and opens the circuit to relay 2CRA. Relay 2CRA restores. Relay 3TS restores and the circuit is at normal.

*Initial fee trunk control*

The initial fee trunk, when seized, closes ground to lamp call pilot 23CPL (FIG. 23) via lead 4CP to signal the operator. By operating the "Accept" key 23AK, the operator enters this call and closes a circuit to the number two winding of relay 4MA. Relay 4MA operates its "X" contacts 4MA11 and short-circuits its number one winding. When the "Accept" key 23AK is released the short-circuit is removed from the number one winding of relay 4MA. Relay 4MA operates completely with both windings in series, closes a circuit to the number one winding of relay 4TA to ground via lead 4OG from the operator's telephone circuit, and closes the circuit from relay 4MG to switch 3HS. Relay 4TA operates, locks, closes part of the circuit from the operator's position circuit to the initial fee trunk, closes the circuit to relay 23SA via lead 4SA, closes lead 3GC through contacts 4MG, 10HMA8 and INT1 and INT2 at 4TA7 to motor magnet 3HS, and removes ground from lead 4GD.

Relay 23SA operates, grounds lead RLS ALM and closes the motor magnet of switch 23M to lead 4GD. Switch 23M steps self-interrupted until it encounters an absence-of-ground on lead 4GD causing switch 23M to stop at that bank contact. Ground is then closed to relay 4MG via lead 4MG.

When lead 3GC was closed to switch 3HS, switch 3HS in the initial fee trunk hunter was caused to step self-interrupted to find the initial fee trunk which is marked by absence-of-ground on lead 3GC. When the initial fee trunk hunter is connected to the initial fee trunk and the operator's control circuit allotter is connected to the operator's control circuit, a circuit is closed to relay 4MG. Relay 4MG operates, locks, opens the circuit to relay 23SA, grounds leads 4GD and 4GC to mark this switch busy, transfers the locking circuit for relay 4MA from lead 3MC to lead 3HC, connects the operator's position circuit to the initial fee trunk, grounds lead 4L to light lamp "guard" 23GL and closes the circuit to relay 4RC via level B of switch 4RS. Relay 4RC operates, closes the number one winding of relay 4PR in opposition to the number two winding of relay 4PR via capacitor 4C. Capacitor 4C charges up until the current in the number two winding of relay 4PR is sufficient to allow relay 4PR to operate. Relay 4PR operates, grounds lead 3PC, closes a circuit at contacts 4PR2 to switch 4RS and opens thereby its operating path. Magnet 4RS operates. Relay 4PR restores, starts the time cycle for the operation of relay 4PR again and opens the circuit to switch 4RS. Switch 4RS restores and advances its wipers one step. This cycle of operation for relay 4PR and switch 4RS continues and each time switch 4RS advances its wipers lead 3FC is connected to the rate relays 4WR, 4XR, 4YR, 4ZR and 4HR. The rate information is now transferred from the initial fee trunk to the operator's control circuit via lead 3FC depending on which group of rate relays are operated.

Figure 23:
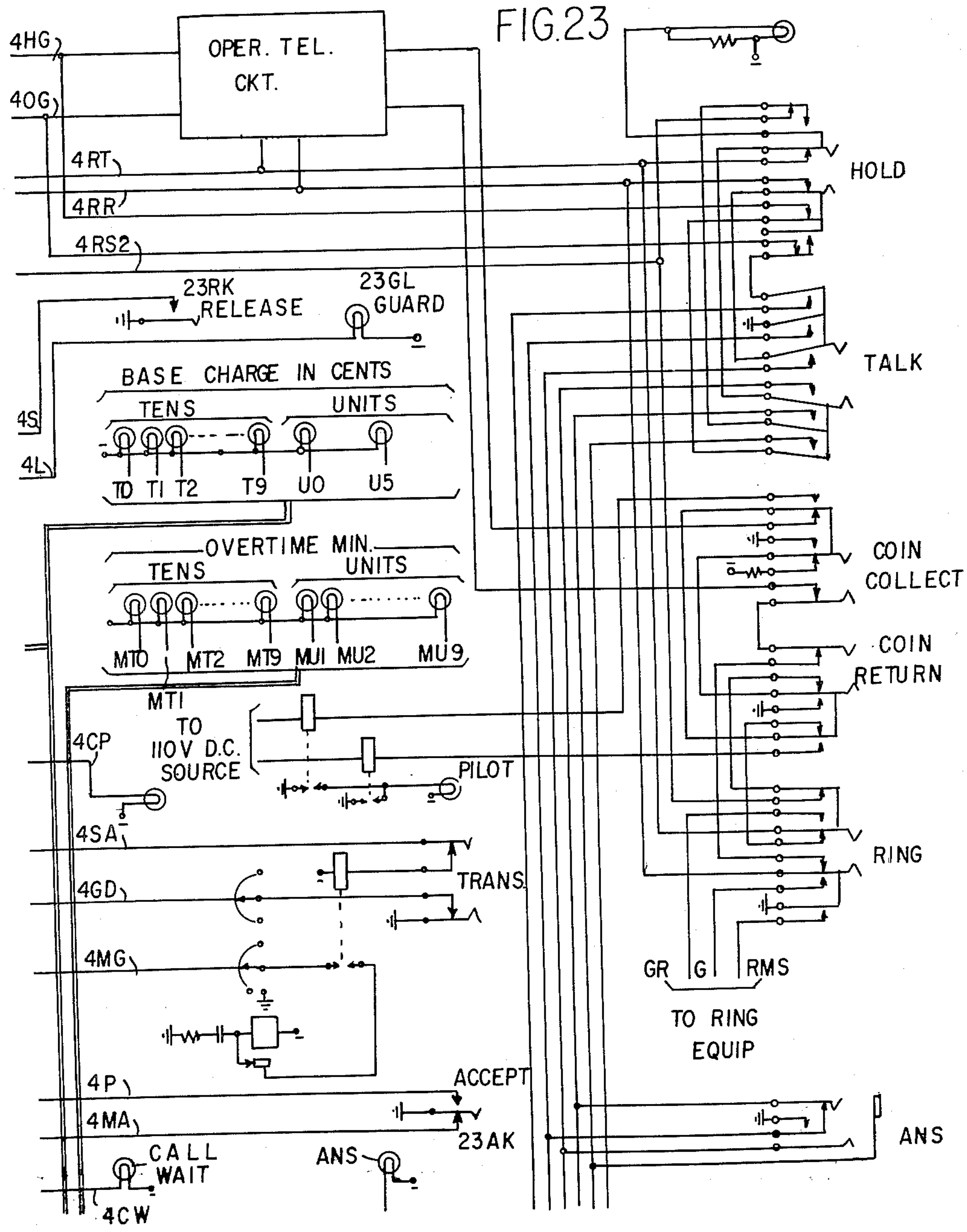
FIG. 23 illustrates in schematic form some of the operator equipment required. This equipment includes the base rate and overtime display panels and associated control keys and lamps.

When switch 4RS steps to its sixth bank contact, the circuit to relay 4RC is opened and ground is closed to the display lamps to indicate the rate of FIGURE 23.

The rate relays indicate to the operator the rate of the call as follows:

| Relays Operated | Rate | Relays Operated | Rate |
|---|---|---|---|
| 4WR, 4XR | .10 | 4XR, 4ZR, 4HR | .55 |
| 4WR, 4XR, 4HR | .15 | 4YR, 4ZR | .60 |
| 4WR, 4YR | .20 | 4YR, 4ZR, 4HR | .65 |
| 4WR, 4YR, 4HR | .25 | 4WR | .70 |
| 4WR, 4ZR | .30 | 4WR, 4HR | .75 |
| 4WR, 4ZR, 4HR | .35 | 4XR | .80 |
| 4XR, 4YR | .40 | 4XR, 4HR | .85 |
| 4XR, 4YR, 4HR | .45 | 4YR | .90 |
| 4XR, 4ZR | .50 | 4YR, 4HR | .95 |

Relay 4RC restores, opens the circuit to switch 4RS to prevent further stepping, opens the circuit to relay 4PR.

The operator now instructs the calling party to deposit the initial fee indicated by the operated rate relays and monitors the coins deposited.

*Release*

When the initial fee has been deposited the operator presses the release key 23RK which closes ground over lead 4S to release the initial fee trunk which opens lead 3HC. Relay 4MA restores, opens the circuits to relays 4TA and 4MG and disconnects the operator's position circuit. Relay 4TA restores. Relay 4MG restores, closes ground to rotary switch magnet 4RS through its INT and ON springs and opens the circuit to the operated rate relays. The rate relays restore. Switch 4RS steps self-interrupted to its normal position where its ON springs restore and open the "homing" circuit. This circuit is now at normal.

If the operator desires to release the switch-train without extending the call, the coin collect 23CCK or "refund" key 23RFK and the "accept" key 23AK are operated simultaneously. A forced release of the switch-train now takes place.

USING AN OVERTIME TRUNK

*Seizure by an allotter*

When a collector requires an overtime trunk, ground is placed on lead 10STB. Relay 5ST operates and closes the circuit to the motor magnet of switch 5MB to relay 5ST1 and the bank contacts of level A via its INT springs. Switch 5MB steps self-interrupted to the first bank contact. If that trunk is busy, direct ground is closed to switch 5MB and relay 5ST1. Switch 5MB reoperates and steps self-interrupted to the next bank contact. This self-interrupted stepping continues until an idle trunk marked by a high resistance ground is found. When an idle trunk is encountered, relay 5ST1 operates and locks in series with magnet 5MB (switch 5MB does not operate because of the high resistance).

When the overtime trunk is seized, resistance ground is closed to the collector finder via lead 2MB and lead 10GB is closed to lead 2MB. An idle collector is marked by ground on lead 10GB, while a collector requiring service is marked by absence-of-ground on lead 10GB. When an idle collector is encountered by switch 5CFB, ground is closed to lead 10GB. Ground on lead 10GB short-circuits a relay in the overtime trunk and operates switch 5CFB. Switch 5CFB steps self-interrupted to the next bank contact. Switch 5CFB continues to hunt until the calling collector is encountered. Absence-of-ground on lead 10GB causes a relay in the overtime trunk to operate in series with switch 5CFB; switch 5CFB does not operate because of the high resistance ground. This causes the collector finder to stop on the collector requiring service and closes lead 10GB to ground to mark the switch busy.

SEIZURE OF OVERTIME TRUNK CIRCUIT (OPERATED: SWITCHES 9MU, 9MT AND 9R)

Upon completion of three minutes of conversation, the collector signals the overtime trunk allotter for an idle overtime trunk. The overtime trunk allotter searches for an idle overtime trunk. Absence of low resistance ground on lead 6B marks this trunk idle.

When seized, battery on lead 6B closes a circuit to relay 6BA. Relay 6BA operates, closes ground through the number two winding of relay 6BB to lead 6MMB, and closes lead 5GB to lead 6MMB, which causes the collector finder to search for the collector signalling for operator's services.

When the collector finder finds the calling collector, absence-of-ground on lead 5GB allows relay 6BB to operate from battery on lead 6MMB. Relay 6BB locks through its "X" contacts 6BB6 to ground on lead 6HB, closes ground to the supervisory lamp 6SL which lights brightly, closes ground to lead 5GB to prevent the calling collector from being seized by another collector finder, closes ground to lead 6B to short-circuit relay 6BA and step off the overtime trunk allotter which allows the allotter to be used on other calls, closes a circuit for relay 6JC to lead 9K, closes ground through relay 7SL to lead 9S, removes ground from lead 6TBB for a possible all overtime trunks busy condition, and closes a circuit for relay 7RC. A relay in the collector operates and completes the loop from the calling paystation to relay 6BF. Relay 6BF operates, closes ground over lead 9L to the answer lamp at the switchboard, and prepares the circuit to relay 6BC. Relay 7RC operates. Relay 6BA restores and opens the circuit to the number one winding of relay 6BB. The answer lamp at the switchboard lights, indicating an awaiting call.

RECEIVING AND TRANSLATING INTO DECIMAL FORM THE CODEL RATE MARKINGS (OPERATED: RELAYS 6BB, 6BF AND 7RC; SWITCHES 9R, 9MT AND 9MU)

When relay 7RC operates, it closes the number one and number two windings of relay 7PR in opposition. When the capacitor 7C7 has discharged, no current is flowing through the number one winding of relay 7PR. Relay 7PR operates on its number two winding, closes ground to lead 5PB, closes the circuit to the magnet of switch 9R, removes the short-circuit from its number one winding, and remains operated with both its windings in series while the capacitor is being charged. Magnet 9R and the magnet of the switch in the collector, which is connected to lead 5PB, operate.

When the capacitors are sufficiently charged, relay 7PR restores, closes its windings in opposition to each other, and opens the circuit to magnet 9R and the magnet on lead 5PB in the collector. The magnets restore and step their respective wipers to the first bank contacts. If the first bank contact of the switch in the collector is marked, ground is extended over lead 5FB to relay 8WR. Relay 8WR operates, locks, and grounds decimal marking lead 7.

Relay 7PR continues functioning as described above, generating pulses to magnet 9R and the magnet in the collector. The magnets follow the pulses of relay 7PR and step their respective switches until the sixth bank contact is reached. While switch 9R is stepped over bank contacts one to five, marking ground from the switch in the collector closes one or two of the 8WR, 8XR, 8YR and 8ZR relays, and possibly the 8HR relay, which operate and lock. Any one or two of the 8WR–8ZR relays, when operated, close one of the 1–0 decimal marking leads.

When switch 9R steps to the sixth bank contact, the circuit is opened to relay 7RC. Relay 7RC restores, removes ground from relay 7PR to prevent relay 7PR from further pulsing, and removes the short-circuit from relay 7PC.

Leads 9T1–9T0 and leads U0 and U5 connect the contacts of relay 9BR to the rate display lamps at the operator's position. Ground on any of the "9T" leads and ground on the 9U0 or 9U5 lead light the rate display lamps at the operator's position. Which "9T" lead will be grounded is determined by relays 8WR–9WZ, which "9U" lead will be grounded is determined by relay 8HR as shown in the table following:

| Operated 8WR–8ZR Relays | Grounded 9T lead | Rate Displayed Relay 8HR Unoperated | Rate Displayed Relay 8HR Operated |
|---|---|---|---|
| 8WR and 8XR | 9T1 | 10¢ | 15¢ |
| 8WR and 8YR | 9T2 | 20¢ | 25¢ |
| 8WR and 8ZR | 9T3 | 30¢ | 35¢ |
| 8XR and 8YR | 9T4 | 40¢ | 45¢ |
| 8XR and 8ZR | 9T5 | 50¢ | 55¢ |
| 8YR and 8ZR | 9T6 | 60¢ | 65¢ |
| 8WR | 9T7 | 70¢ | 75¢ |
| 8XR | 9T8 | 80¢ | 85¢ |
| 8YR | 9T9 | 90¢ | 95¢ |
| 8ZR | 9T0 | 00¢ | 05¢ |

OPERATOR ENTERS THE CONNECTION (OPERATED: RELAYS 6BB, 6BF, ONE OR TWO OF THE 8WR–8WZ RELAYS, AND POSSIBLY RELAY 8HR; SWITCHES 9MU AND 9MT)

The operator operates the "talk and hold" key to the "talk" position, which closes ground to lead 9K and high resistance battery to lead 9S. Relay 7SL operates and locks in series with the number one winding of relay 8TK. Relay 6JC operates, removes direct ground from leads 9L, 9ML and supervisory lamp 6SL, and closes the number two winding of relay 8TK in opposition to the number one winding of relay 8TK. The lamps (supervisory lamp 6SL on lead 9ML, and the answer lamp on lead 9L) light dimly from ground through resistors 6R5 and 6R7. Relay 8TK operates on its number two winding, locks, short-circuits relay 7BD and closes a circuit through the number one winding of relay 8TA to ground on lead 9OP. Relay 8TA operates, locks on its number two winding to ground on lead 9H, completes the transmission loop and closes a circuit to relay 7PC. Relay 7PC operates, locks in series with relay 8TS, which is now short-circuited by ground at the contacts of relay 8TA, closes ground to lead 5PB to prepare the collector for overtime timing, and closes a circuit to relay 9BR. Relay 9BR operates and extends the rate marking through the contacts of relays 8WR–8ZR and 8HR to the operator's position rate display lamps.

COIN COLLECT (OPERATED: RELAYS 6BB, 6BF, 6JC, 7PC, 7SL, 8TK, 8TA, 9BR, ONE OR TWO OF THE 8WR–8ZR RELAYS, AND POSSIBLY 8HR; SWITCHES 9MU AND 9MT)

To collect coins at the paystation, the operator operates the coin collect key 23CCK. This removes battery from lead 9S and closes +110V to leads 9T and 9R. Relay 7SL restores, closes +110V to relay 6CC, opens the operator's side of the transmission loop, opens the circuit to the number one winding of relay 8TK and closes a circuit to 7CCA. Relay 6CC operates. Relay 7CCA operates, opens the paystation side of the transmission loop and closes +110V on leads 9T and 9R to leads 5TB and 5RB to collect the coins at the paystation.

When the operator releases the coin collect key 23CCK, +110V is removed from leads 9T and 9R and high resistance battery is reclosed to lead 9S. Relay 6CC restores. Relay 7SL operates, completes the operator's side of the transmission loop, and opens the circuit of relay 7CCA. Relay 7CCA restores, completes the transmission loop and opens the loop through resistor 7R9 to relay 6BF.

CLR HOLDING (OPERATED RELAYS: SAME AS IN PRECEDING SECTION)

When the coins have been collected, the operator informs the calling party of the overtime condition, and operates the "talk and hold" key to the "hold" position. This opens leads 9T, 9R, 9H, and 9OP, and closes low resistance battery through the supervisory lamp at the switchboard to lead 9S. Relay 8TK restores. Relay 8TA restores, removes the short-circuit from relay 8TS and opens the circuit to relay 9BR. Relay 9BR restores and extinguishes the rate lamps at the operator's position. Relay 8TS operates, removes ground from lead 5PB to start the timing switches in the collector, closes lead 5PB to magnet 9MU and grounds the level A wiper of switch 9MU.

TIMING (OPERATED: RELAYS 6BB, 6BF, 6JC, 7SL, 7PC, 8TS, ONE OR TWO OF THE 8WR–8ZR RELAYS AND POSSIBLY 8HR; SWITCHES 9MU AND 9MT)

After each minute of conversation, the collector closes ground pulses to lead 5PB. Magnet 9MU operates on each ground pulse and when the pulse is removed, steps its wipers to the next bank contact.

After seven pulses over lead 5PB (eight minutes of overtime), switch 9MU rests on the eighth bank contact and when the eighth pulse is closed to lead 5PB, the circuit is closed to magnet 9MT in multiple with magnet 9MU. Magnets 9MU and 9MT operate, and when the ground pulse is removed switch 9MU steps to the ninth bank contact and switch 9MT steps to the first bank contact. At the end of the ninth ground pulse over lead 5PB, switch 9MU steps to the tenth bank contact. Ground through the tenth bank of level B of switch 9MU closes the circuit of magnet 9MU, which reoperates, opens its own circuit, restores, and steps its wipers to the normal position. The above functions of switch 9MU are repeated in each of the succeeding ten minute intervals. Switch 9MT is stepped once during each ten minute interval in the same manner as described above.

Should the overtime conversation reach 98 minutes, switch 9MT will be on the ninth bank contact and switch 9MU will be on the eighth bank contact, and the circuit will be closed through the level C wiper of switch 9MU and the level B wiper of switch 9MT to relay 8TE. Relay 8TE operates, locks, and closes lead 120IPM to relay 7BD. Relay 7BD follows the pulses on lead 120IPM, changing the resistance on lead 9S between high and low, which causes the supervisory lamp at the operator's position to flash. After 100 minutes of overtime conversation, switches 9MU and 9MT will be at normal. The next 100 minute cycle will be identical to the one described above.

The time indicating lamps at the operator's position are connected to the 9MU and 9MT leads. The circuit to these lamps will be provided through the bank contacts of switches 9MU and 9MT. Switch 9MU provides the unit minutes indication, and switch 9MT provides the tens minutes indication. Leads 9MU1–9MU0 are connected to unit lamps 1–0 respectively. Leads 9MT1–9MT0 are connected to tens lamps 1–0 respectively. Note that after one minute of conversation the wiper of switch 9MU is closed to lead 9U2, at the end of two minutes to lead 9U3 and so on. Thus, the time that will be indicated to the operator at the end of conversation will be one minute ahead of the actual conversation time; also, at the end of each hundred minutes of conversation, the time on the switches reads 01.

DISCONNECT SUPERVISION (OPERATED: RELAYS 6BB, 6BF, 6JC, 7PC, 7SL, 8TS, ONE OR TWO OF THE 8WR–8ZR RELAYS, POSSIBLY 8HR, 8TE AND 7BD)

When the calling party disconnects, the loop is opened to relay 6BF. Relay 6BF restores, closes lead 120IPM to lead 9L to flash the answer lamp at the switchboard equipment, closes 120IPM to relay 7BD, which flashes the supervisory lamp at the switchboard in the same manner as described in the preceding section and closes ground to lead 5FB. Ground on lead 5FB causes the collector to release the switch-train to the called line.

When the called party disconnects, ground on lead 5FB closes a circuit to relay 6BC. Relay 6BC operates and closes lead 60IPM to relay 7BD, functions as in the succeeding section, except that 60IPM instead of 120IPM is now used.

RE-RING AND COIN COLLECT (OPERATED RELAYS SAME AS IN THE PRECEDING SECTION)

Upon receiving disconnect supervision, as described in the succeeding section, the operator operates the "Talk and Hold" key to the "Talk" position. This transfers lead 9S from low resistance battery to high resistance battery. Relay 8TK operates on its number two winding, short-circuits relay 7BD which restores, if operated at this time, and closes a circuit to the number one winding of relay 8TA to lead 9OP. Relay 8TA operates, completes the transmission loop to the operator, and closes a circuit to relay 9BR. Relay 9BR operates and extends the rate and time marking ground to the respective display lamps.

If the calling party is holding the connection, the operator instructs the party to deposit overtime charges, and collects the coins in the same manner as described in an earlier section.

If the calling party has disconnected, the operator may rering the party by operation of the "Ring" key. This causes this circuit to function in the same manner as on coin collect except that relay 6CC does not operate and ringing current, instead of coin collect current, is closed to the line leads.

RELEASE (OPERATED: RELAYS 6BB, 6JC, 8TS, 8TK, 7SL, 8TA, ONE OR TWO OF THE 8WR–8ZR RELAYS, AND POSSIBLY 8HR)

When the coins have been collected and the calling party disconnects, the operator places the "Talk and Hold" key at the normal position, which removes battery from leads 9S and 9H, and ground from lead 9K. Relay 6JC restores, closes ground to lead 6 RLS ALM, opens the circuit to the number two winding of relay 8TK and closes a circuit to the number two winding of relay 6BE. Relay 7SL restores. Relay 8TK restores. Relay 8TA restores and opens the circuit to relay 9BR. Relay 9BR restores and extinguishes the time and rate lamps. Relay 6BE operates, locks on its number one winding in series with magnet 9MU, closes lead 120IPM to the supervisory lamp 6SL and lead 9ML, and short-circuits the number one winding of relay 6BB. Lamp supervisory 6SL on lead 9ML flashes at 120IPM. Relay 6BB restores, opens lead 6B, closes lead 6TBB, opens the circuits to relays 8TS and 7PC, and opens the circuits to relays 8HR and 8WR–8ZR, whichever is operated. Relays 8TS, 8HR, 8WR–8ZR and 7PC restore. Magnet 9MU operates in series with the number one winding of relay 6BE, opens its own circuit, restores, steps the wipers of switch 9MU to the next bank contact, closes its own circuit, reoperates and continues stepping the switch in the same manner until its normal position is reached. When the normal position is reached, the off-normal springs 9MU3 and 9MU4 operate and transfer ground through the number one winding of relay 6BE from magnet 9MU to magnet 9MT. Magnet 9MT steps the wipers of switch 9MT to the normal position in the same manner as magnet 9MU. The off-normal springs 9MT1 and 9MT2 operate when the switch reaches its normal position and transfers ground through the number one winding of relay 6BE from magnet 9MT to magnet 9R. Magnet 9R steps the wipers of switch 9R to the normal position in the same manner as magnet 9MT or 9MU. Relay 6BE is slow-to-release and remains operated during stepping. When switch 9R reaches the normal position, the off-normal springs 9R3 and 9R4 operate and open the circuit to magnet 9R and relay 6BE. Relay 6BE restores, removes lead 120IPM from lead 9ML and supervisory lamp 6SL removes ground from lead RLS ALM and removes ground from lead 5GB to mark this circuit idle to the collector. The circuit is now at normal. Should switch 9MU, 9MT or 9R fail to "home," relay 6BE will remain operated and supervisory lamp 6SL on lead ML will continue flashing from ground pulses on lead 120IPM.

*Overtime trunk control*

When an overtime trunk is seized, ground is extended over lead 9L to light lamp 23ANS. The operator enters the circuit by operating the "Talk" key which places ground on lead 9K and resistance battery on lead 9S. The overtime trunk replaces direct ground on lead 9L with resistance ground causing the 23ANS lamp to light dimly. The position rate lamps are now operated by the trunk circuit. To collect coins the operator presses the coin control key 23CCK to the coin collect position which closes +110V to leads 9R and 9T and removes battery from lead 9S. The operator then informs the calling party of the overtime condition. The "Hold" key is now placed in the "hold" position which opens the operator's transmission circuit and closes battery through the supervisory lamp to ground on lead 9S. The collector circuit extinguishes the rate lamps. The overtime lamps now indicate the overtime to the next highest minute. The lighted lamps change once a minute. When 98 minutes of overtime conversation have elapsed the supervisory lamp will flash at a 120IPM rate. After 100 minutes the timing cycle is repeated.

*Release*

When the called party disconnects, the supervisory lamp flashes at 60IPM to indicate that the calling party is holding the connection. The operator now instructs the calling party to deposit the overtime charges.

If the calling party has disconnected, the supervisory lamp flashes at 120IPM to indicate this condition to the operator. The operator may now re-ring the calling party by operating the "ring" key and releasing the "Hold" key. Ringing current is now closed to the line via leads 9R and 9T. When the calling party answers, the operator instructs the calling party to deposit the overtime charges.

If the operator desires to collect or refund coins, the coin collect key 23CCK is operated to either the coin collect or coin refund position. If coins are to be collected, +110V is applied to the line loop and lead 9S is opened. If coins are to be refunded, —110V is applied to the line loop and lead 9S is opened.

After all necessary charges have been made, all keys in the overtime control circuit are restored to normal and the circuit is ready to handle another call.

The new and novel automatic telephone exchange equipment which has been set forth in the foregoing disclosure is believed to be a distinct and definite advancement in the art. The inherent simplicity and adaptability of the disclosed paystation customer toll dialling arrangement facilitates inclusion thereof in automatic exchanges. Further, the savings resulting from its use is a definite factor for influencing the extensive use of it by operating companies.

The automatic nature of the equipment also has definite appeal to the paystation customers and is expected to encourage them in the placement of a greater number of toll calls.

The specific features of the arrangement as set forth heretofore each tend to provide a system which is comparatively simple and economical. Paystation customers can, with the system of this disclosure, dial short haul toll calls which had hitherto been completed only by manual operators. These calls can now be extended by the register sender equipment of the exchange, utilizing the operator merely to supervise the disposition of coins to cover the charges for the call being placed.

These and various other features of the disclosed apparatus are believed to constitute a new and desirable advancement in the art, these features and others being now set forth in the accompanying claims.

What is claimed is:

1. In a telephone system, an exchange including, a plurality of classes of subscribers, one of said classes including paystations, a first register-sender-translator, a second register-sender-controller, an operator position, means for temporarily storing in said first register a plurality of variable items of record information pertaining to a telephone connection and including the identification of the class of the calling station involved in the connection and the called station directory number, other means in said register-sender-translator responsive to the registration therein of an indication of a call from a paystation to send the route and rate information to said second register-sender-controller for the processing of the call, circuit means in said second register-sender-controller for operably connecting said calling paystation with said operator position, second circuit means in said second register-sender-controller effective to forward the rate information to the operator position whereby the calling paystation user may be orally informed of the cost of the attempted call, and keyswitch means at said operator position operative to effectuate the collection of coins deposited at said paystation.

2. In a telephone system, an exchange including, a plurality of classes of subscribers, one of said classes including paystations, a first register-sender-translator, a second register-sender-controller, an operator position, means for temporarily storing in said first register a plurality of variable items of record information pertaining to a telephone connection and including the identification of the class of the calling station involved in the connection and the called station directory number, other means in said register-sender-translator responsive to the registration therein of an indication of a call from a paystation to send the route and rate information to said second register-sender-controller for the processing of the call, circuit means in said second register-sender-controller for operably connecting said calling paystation with said operator position, second circuit means in said second register-sender-controller effective to forward the rate information to the operator position whereby the calling paystation user may be orally informed of the cost of the attempted call, keyswitch means at said operator position for controlling the collection of coins deposited by said paystation user, third circuit means in said second register-sender-controller effective upon release of said operator position for extending the call to the called station.

3. A telephone system as claimed in claim 2, including a fourth circuit means in said second register-sender-controller to extend a refund potential to said paystation upon the call not being completed.

4. A telephone system such as claimed in claim 3, including a fifth circuit means effective upon the lapse of three minutes of conversation time to recall said operator position and including other means for forwarding the rate information for said call in process to said operator position.

5. In a telephone system, an exchange including, a plurality of classes of subscriber stations, one of said classes comprising paystations, a first register-sender-translator, a second register-sender-controller, an operator position, means for temporarily storing in said first register a plurality of variable items of information pertaining to a telephone connection and including the identification of the class of the calling station involved in the connection and the called station directory number, other means in said register-sender-translator responsive to the registration therein of an indication of a call from a paystation to send the route and rate information to said second register-sender-controller for the processing of the call, first circuit means in said second register-sender-controller for extending battery feed potential to said calling paystation, other circuit means in said second register-sender-controller for operably connecting said calling paystation with said operator position, second circuit means in said second register-sender-controller effective to forward the rate information to the operator position whereby the calling paystation user may be orally informed of the cost of the attempted call, keyswitch means at said operator position for controlling the collection of the coins deposited by the paystation user, third circuit means in said register-sender-controller effective upon release of the operator position for extending the call to the called station.

6. In a telephone system, an exchange including, a plurality of classes of subscriber stations, one of said classes comprising pay-stations, a first register-sender-translator, a second register-sender-controller, an operator position, means for temporarily storing in said first register a plurality of variable items of information pertaining to a telephone connection and including the identification of the class of the calling station involved in the connection and the called station directory number, other means in said register-sender-translator responsive to the registration therein of an indication of a call from a paystation to send the route and rate information to said second register-sender-controller for the processing of the call, first circuit means in said second register-sender-controller for extending battery feed potential to said calling paystation, second circuit means in said second register-sender-controller for operably connecting said paystation with said operator position, third circuit means in said second register-sender-controller effective to reverse the battery feed potential to said incoming station to thereby prepare the paystation repeater in said calling paystation loop for coin control pulses, fourth circuit means effective to forward the rate information to the operator position whereby the calling paystation user may be orally informed of the cost of the attempted call, keyswitch means at said operator position for controlling the collection of coins deposited by said paystation user, fifth circuit means in said second register-sender-controller effective upon release of said operator position for extending the call to the called station.

7. In a telephone system, an exchange including, a plurality of classes of subscribers, one of said classes comprising paystations, a first register-sender-translator, a second register-sender-controller, a plurality of operator positions, means for temporarily storing in said first register a plurality of variable items of record information and including the identification of the class of the calling station involved in the connection and the called station directory number, other means in said register-sender-translator responsive to the registration therein of an indication of a call from a paystation to the send route and rate information to said second register-sender-controller for the processing of the call, a plurality of selectively operable switching devices associated with each operator position arranged to connect said operator positions with said second register-sender-controller, an allotter switch arranged to sequentially allot a free one of said operator positions with said second register, means associated with said switching devices and said allotter to preselect a second switching device and associated operator position while another is in operation, other means associated with said switching device and said allotter controlled by said switching device for preventing said allotter from preselecting said switching device, circuit means in said second register-sender-controller effective upon the acceptance at said operator position for operably connecting said calling paystation with said operator position, second circuit means effective to forward the rate information to the operator position, whereby the calling paystation user may be orally informed of the cost of the attempted call, keyswitch means at said operator position for controlling the collection of the coins deposited by said paystation user, third circuit means in said second register-sender-controller effective upon release of said operator position for extending the call to the called station.

8. In a telephone system such as claimed in claim 7, fourth circuit means in said second register-sender-controller responsive to a stop-send or busy condition during the extension of a call to the called station to forward a refund potential to said calling paystation.

9. In an automatic toll ticketing telephone system, switching apparatus, a calling paystation line, a called station having a plural digit directory number, a collector circuit, a register-sender, first means in said register-sender for operatively associating itself with said calling paystation in response to the placement of a call therefrom, second means in said register-sender controlled in response to said connection to register the class of said calling station as that of a paystation, a translator, means for operatively connecting said register-sender to said translator, means in said translator controlled in response to said registered class indication in said register-sender after connection thereto for translating said class indication into appropriate routing digits, means in said register-sender effective in response to said routing digit for routing said calling paystation to said collector circuit, an operator position, indicating means commonly associated with said operator position, a sender circuit, means in said sender circuit for accepting routing digits, second means in said sender circuit for resending said routing digts, a first trunk circuit, means in said collector circuit for operatively associating itself with said sender circuit, second means in said collector circuit for accepting said routing digits from said register-sender and forwarding them to said sender circuit, third means in said collector circuit for operatively associating said first trunk circuit with itself, means in said trunk circuit for operatively associating itself with said operator position upon seizure by said collector circuit, second means in said trunk circuit for indicating to said collector circuit of said operative connection to said operator position, means in said collector circuit responsive to said indication to forward appropriate rate marking pulses to said operator position, and other means in said collector circuit also effective in response to said indication to complete a talking connection from said calling paystation to said operator position whereby said operator may inform said paystation user of the charge for said attempted call.

10. In an automatic toll ticketing telephone system, switching apparatus, a calling paystation line, a called station having a plural digit directory number, a collector circuit, a regsiter-sender, first means in said register-sender for operatively associating itself with said calling paystation in response to the placement of a call therefrom, second means in said register-sender controlled in response to said connection to register the class of said calling station as that of a paystation, a translator, means for operatively connecting said register-sender to said translator, means in said translator controlled in response to said registered class indication in said register-sender after connection thereto for translating said class indication into appropriate routing digits, means in said register-sender effective in response to said routing digit for routing said calling paystation to said collector circuit, an operator position, indicating means commonly associated with said operator position, a sender circuit, means in said sender circuit for accepting routing digits and second means in said sender circuit for resending said routing digits, a first trunk circuit, means in said collector circuit for operatively associating itself with said sender circuit, second means in said collector circuit for accepting said routing digits from said register-sender and forwarding them to said sender circuit, third means in said collector circuit for operatively associating said first trunk circuit with itself, means in said trunk circuit for operatively associating itself with said operator position upon seizure by said collector circuit, second means in said trunk circuit for indicating to said collector circuit of said operative connection to said operator position, means in said collector circuit responsive to said indication to forward appropriate rate marking pulses to said operator position, other means in said collector circuit also effective in response to said indication to complete a talking connection from said calling paystation to said operator position whereby said operator may inform said paystation user of the charge for said attempted call, and means in said first trunk circuit effective to control said paystation to refund any initial coin deposit, other means in said first trunk circuit effective to repeat the coin control operations from said operator's position.

11. In an automatic toll ticketing telephone system, switching apparatus, a calling paystation line, a called station having a plural digit directory number, a collector circuit, a register-sender, first means in said register-sender for operatively associating itself with said calling paystation in response to the placement of a call therefrom, second means in said register-sender controlled in response to said connection to register the class of said calling station as that of a paystation, a translator, means for operatively connecting said register-sender to said translator, means in said translator controlled in response to said registered class indication in said register-sender after connection thereto for translating said class indication into appropriate routing digits, means in said register-sender effective in response to said routing digit for routing said calling paystation to said collector circuit, an operator position, indicating means commonly associated with said operator position, a sender circuit, means in said sender circuit for accepting routing digits and second means in said sender circuit for resending said routing digits, a first trunk circuit, means in said collector circuit for operatively associating itself with said sender circuit, second means in said collector circuit for accepting said routing digits from said register-sender and forwarding them to said sender circuit, third means in said collector circuit for operatively associating said first trunk circuit with itself, means in said trunk circuit for operatively associating itself with said operator position, second means in said trunk circuit for indicating to said collector circuit of said operative connection to said operator position, means in said collector circuit responsive to said indication to forward appropriate rate marking pulses to said operator position, other means in said collector circuit also effective in response to said indication to complete a talking connection from said calling paystation to said operator position whereby said operator may inform said paystation user of the charge for said attempted call, means in said first trunk circuit effective to control said paystation to refund any initial coin deposit upon connection with said operator circuit, other means in said first trunk circuit effective to repeat the coin control operations from said operator's position, means in said collector's circuit to control said sender circuit to send all but the last two digits of the called station routing code and directory number, and other means in said collector circuit to control said sender circuit to send said last two digits of said directory number upon release of said operator position from said first trunk circuit.

12. In an automatic toll ticketing telephone system, switching apparatus, a calling paystation line, a called station having a plural digit directory number, a collector circuit, a register-sender, first means in said register-sender for operatively associating itself with said calling paystation in response to the placement of a call therefrom, second means in said register-sender controlled in response to said connection to register the class of said calling station as that of a paystation, a translator, means for operatively connecting said register-sender to said translator, means in said translator controlled in response to said registered class indication in said register-sender after connection thereto for translating said class indication into appropriate routing digits, means in said register-sender effective in response to said routing digit for routing said calling paystation to said collector circuit, an operator position, indicating means commonly associated with said operator position, a sender circuit, means in said sender circuit for accepting routing digits and second means in said sender circuit for resending said routing digits, a first trunk circuit, means in said collector circuit for operatively associating itself with said sender circuit, second means in said collector circuit for accepting said routing digits from said register-sender and forwarding them to said sender circuit, third means in said collector circuit for operatively associating said first trunk circuit with itself, means in said trunk circuit for operatively associating itself with said operator position, second means in said trunk circuit for indicating to said collector of said operative connection to said operator position, means in said collector circuit responsive to said indication to forward appropriate rate marking pulses to said operator position, means in said collector circuit effective to complete a talking connection from said calling paystation to said operator position whereby said operator may inform said paystation user of the charge for said attempted call, means in said first trunk circuit effective to control said paystation to refund any initial coin deposit, other means in said first trunk circuit effective to repeat the coin control operations from said operator's position, means in said collector circuit to control said sender circuit to send all but the last two digits of the called station routing code and directory number, other means in said connector circuit to control said sender circuit to send said last two digits of said directory number upon release of said operator position from said first trunk circuit, other means in said collector circuit effective upon completion of sending of the directory number of said called station to release said sender circuit and cut through the calling paystation loop.

13. In an automatic toll ticketing telephone system, switching apparatus, a calling paystation line, a called station having a plural digit directory number, a collector circuit, a register-sender, first means in said register-sender for operatively associating itself with said calling paystation in response to the placement of a call therefrom, second means in said register-sender controlled in response to said connection to register the class of said calling station as that of a paystation, a translator, means for operatively connecting said register-sender to said translator, means in said translator controlled in response to said registered class indication in said register-sender after connection thereto for translating said class indication into appropriate routing digits, means in said register-sender effective in response to said routing digit for routing said calling paystation to said collector circuit, an operator position, indicating means commonly associated with said operator position, a sender circuit, means in said sender circuit for accepting routing digits and second means in said sender circuit for resending said routing digits, a first trunk circuit, means in said collector circuit for operatively associating itself with said sender circuit, second means in said collector circuit for accepting said routing digits from sad register-sender and forwarding them to said sender circuit, third means in said collector circuit for operatively associating said first trunk circuit with itself, means in said trunk circuit for operatively associating itself with said operator position, second means in said trunk circuit for indicating to said collector circuit of said operative connection to said operator position, means in said collector circuit responsive to said indication to forward appropriate rate marking pulses to said operator position, means in said collector circuit effective to complete a talking connection from said calling paystation to said operator position whereby said operator may inform said paystation user of the charge for said attempted call, means in said first trunk circuit effectvie to control said paystation to refund any initial coin deposit, other means in said first trunk circuit effective to repeat the coin control operations from said operator's position, means in said collector circuit to control said sender circuit to send all but the last two digits of the called station routing code and directory number, other means in said connector circuit to control said sender circuit to send said last two digits of said directory number upon release of said operator position from said first trunk circuit, other means in said collector circuit effective upon completion of sending of the directory number of said called station to release said sender circuit and cut through the calling paystation loop, means in said collector circuit effective upon recognizing non-completion of said call to cause said paystation to refund deposited coins.

14. In an automatic toll ticketing telephone system, switching apparatus, a calling paystation line, a called station having a plural digit directory number, a collector circuit, a register-sender, first means in said register-sender for operatively associating itself with said calling paystation in response to the placement of a call therefrom, second means in said register-sender controlled in response to said connection to register the class of said calling station as that of a paystation, a translator, means for operatively connecting said register-sender to said translator, means in said translator controlled in response to said registered class indication in said register-sender after connection thereto for translating said class indication into appropriate routing digits, means in said register-sender effective in response to said routing digit for routing said calling paystation to said collector circuit, an operator position, indicating means commonly associated with said operator position, a sender circuit, means in said sender circuit for accepting routing digits and second means in said sender circuit for resending said routing digits, a first trunk circuit, means in said collector circuit for operatively associating itself with said sender circuit, second means in said collector circuit for accepting said routing digits from said register-sender and forwarding them to said sender circuit, third means in said collector circuit for operatively associating said first trunk circuit with itself, means in said trunk circuit for operatively associating itself with said operator position, second means in said trunk circuit for indicating to said collector circuit of said operative connection to said operator position, means in said collector circuit responsive to said indication to forward appropriate rate marking pulses to said operator position, means in said collector circuit effective to complete a talking connection from said calling paystation to said operator position whereby said operator may inform said paystation user of the charge for said attempted call, means in said first trunk circuit effective to control said paystation to refund any initial coin deposit, other means in said first trunk circuit effective to repeat the coin control operations from said operator's position, means in said collector circuit to control said sender circuit to send all but the last two digits of the called station routing code and directory number, other means in said collector circuit to control said sender circuit to send said last two digits of said directory number upon release of said operator position from said first trunk circuit, other means in said collector circuit effective upon completion of sending of the directory number of said called station to release said sender circuit and cut through the calling paystation loop, means in said collector circuit effective upon recognizing non-completion of said call to cause said paystation to refund deposited coins, other means in said collector circuit effective upon termination of three minutes of conversation time to signal a second trunk circuit, means for operatively associating said second trunk circuit in response to said signal with said collector circuit, signal means in said second trunk circuit for operatively associating itself with said operator's position, means in said collector circuit effective to forward to said operator position an indication of the rate for said call, third means in said sender trunk circuit effective to extend coin collection potential from said operator position to said paystation and for completing a talking connection between said paystation and said operator position whereby said paystation user may be informed of the overtime conditions for said call.

15. In an automatic toll ticketing telephone system, switching apparatus, a calling paystation line, a called station having a plural digit directory number, a collector circuit, a register-sender, first means in said register-sender for operatively associating itself with said calling paystation in response to the placement of a call therefrom, second means in said register-sender controlled in response to said connection to register the class of said calling station as that of a paystation, a translator, means for operatively connecting said register-sender to said translator, means in said translator controlled in response to said registered class indication in said register-sender after connection thereto for translating said class indication into appropriate routing digits, means in said register-sender effective in response to said routing digit for routing said calling paystation to said collector circuit, an operator position, indicating means commonly associated with said operator position, a sender circuit, means in said sender circuit for accepting routing digits and second means in said sender circuit for resending said routing digits, a first trunk circuit, means in said collector circuit for operatively associating itself with said sender circuit, second means in said collector circuit for accepting said routing digits from said register-sender and forwarding them to said sender circuit, third means in said collector circuit for operatively associating said first trunk circuit with itself, means in said trunk circuit for operatively associating itself with said operator position, second means in said trunk circuit for indicating to said collector circuit of said operative connection to said operator position, means in said collector circuit responsive to said indication to forward appropriate rate marking pulses to said operator position, means in said collector circuit effective to complete a talking connection from said calling paystation to said operator position whereby said operator may inform said paystation user of the charge for said attempted call, means in said first trunk circuit effective to control said paystation to refund any initial coin deposit, other means in said first trunk circuit effective to repeat the coin control operations from said operator's position, means in said collector circuit to control said sender circuit to send all but the last two digits of the called station routing code and directory number, other means in said collector circuit to control said sender circuit to send said last two digits of said directory number upon release of said operator position from said first trunk circuit, other means in said collector circuit effective upon completion of sending of the directory number of said called station to release said sender circuit and cut through the calling paystation loop, means in said collector circuit effective upon recognizing non-completion of said call to cause said paystation to refund deposited coins, other means in said collector circuit effective upon termination of three minutes of conversation time to signal a second trunk circuit, means for operatively associating said second trunk circuit in response to said signal with said collector circuit, signal means in said second trunk circuit for operatively associating itself with said operator's position, means in said collector circuit effective to forward to said operator position an indication of the rate for said call, third means in said sender trunk circuit effective to extend coin collection potential from said operator position to said paystation and for completing a talking connection between said paystation and said operator position whereby said paystation user may be informed of the overtime conditions for said call, said second trunk circuit effective in response to a control from said operator position to retain said operator position in a condition to supervise for the duration of said call, other means in said collector circuit effective to forward to said operator position indicating means, the time duration of said call in one minute intervals.

16. A telephone system such as claimed in claim 15, where said rate forwarded by said rate marking pulses are displayed at said operator's position on a panel including a first set of base charge lamps located on said panel and a second set of overtime minutes lamps located on said panel, each being individually operated responsive to said rate marking pulses for indicating the type of data being temporarily displayed by said panel.

References Cited in the file of this patent

UNITED STATES PATENTS

| | | |
|---|---|---|
| 2,352,492 | Ostline | June 27, 1944 |
| 2,369,868 | Taylor et al. | Feb. 20, 1945 |
| 2,370,712 | Busch | Mar. 6, 1953 |
| 2,761,900 | Joel et al. | Sept. 4, 1956 |
| 2,846,507 | Sandalls et al. | Aug. 5, 1958 |